(12) United States Patent
Yu

(10) Patent No.: US 12,453,212 B2
(45) Date of Patent: Oct. 21, 2025

(54) DISPLAY PANEL AND DISPLAY DEVICE

(71) Applicant: Shanghai Tianma Microelectronics Co., Ltd., Shanghai (CN)

(72) Inventor: Quanpeng Yu, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 709 days.

(21) Appl. No.: 17/652,694

(22) Filed: Feb. 27, 2022

(65) Prior Publication Data

US 2022/0190200 A1 Jun. 16, 2022

(30) Foreign Application Priority Data

Jun. 30, 2021 (CN) .......................... 202110739657.X

(51) Int. Cl.
*H10H 20/819* (2025.01)
*G06F 3/041* (2006.01)
*H01L 25/075* (2006.01)
*H10H 20/831* (2025.01)

(52) U.S. Cl.
CPC ....... *H10H 20/819* (2025.01); *G06F 3/04164* (2019.05); *H01L 25/0753* (2013.01); *H10H 20/831* (2025.01)

(58) Field of Classification Search
CPC ..... H01L 33/20; H01L 25/0753; H01L 33/38; H01L 33/50; H01L 33/60; H01L 27/156; H01L 33/46; H01L 33/505; H01L 33/54; G06F 3/04164; G06F 3/0412; G06F 3/044
See application file for complete search history.

(56) References Cited

U.S. PATENT DOCUMENTS

| | | | | |
|---|---|---|---|---|
| 2012/0162984 | A1* | 6/2012 | Fujimori | H10H 20/857 438/27 |
| 2017/0133357 | A1* | 5/2017 | Kuo | H10H 20/855 |
| 2020/0026383 | A1* | 1/2020 | Hwang | G06F 3/04184 |
| 2020/0343410 | A1* | 10/2020 | Iguchi | H10H 20/856 |
| 2021/0151702 | A1* | 5/2021 | Fan | H10K 50/115 |

\* cited by examiner

*Primary Examiner* — Marlon T Fletcher
*Assistant Examiner* — Samuel Jonathan Smith
(74) *Attorney, Agent, or Firm* — KILPATRICK TOWNSEND & STOCKTON LLP

(57) ABSTRACT

A display panel includes a first substrate, a second substrate, a plurality of light-emitting elements, a plurality of baffle wall structures, and a plurality of first auxiliary structures. The plurality of light-emitting elements and the plurality of baffle wall structures are located between the first substrate and the second substrate. The plurality of light-emitting elements are disposed on the first substrate, the plurality of baffle wall structures are disposed on the second substrate, and a baffle wall structure is located between adjacent light-emitting elements. The plurality of first auxiliary structures are disposed between at least a part of the plurality of light-emitting elements and the first substrate. The first auxiliary structures and gaps are alternated in a direction which is parallel to the first substrate, and the gap is a space between the baffle wall structure and the first substrate.

16 Claims, 12 Drawing Sheets

DISPLAY PANEL AND DISPLAY DEVICE

CROSS-REFERENCE TO RELATED APPLICATION(S)

This application claims priority to Chinese Patent Application No. 202110739657.X filed Jun. 30, 2021, the disclosure of which is incorporated herein by reference in its entirety.

FIELD

Embodiments of the present disclosure relate to the field of display and in particular to a display panel and a display device.

BACKGROUND

With the continuous development of science and technology, more and more electronic devices with display functions are widely used in people's daily life and work, bringing great convenience to people's daily life and work and becoming indispensable and important tools for people today.

A display panel is an important component of an electronic device to implement a display function. In the existing display panel, mutual crosstalk will be caused among light emitted by adjacent light-emitting elements, which affects a display effect.

SUMMARY

The present disclosure provides a display panel and a display device to improve a display effect of the display panel.

In a first respect, embodiments of the present disclosure provide a display panel. The display panel includes a first substrate and a second substrate which are disposed opposite each other.

The display panel further includes a plurality of light-emitting elements and a plurality of baffle wall structures which are located between the first substrate and the second substrate. The plurality of light-emitting elements are disposed on the first substrate, the plurality of baffle wall structures are disposed on the second substrate, and each baffle wall structure of the plurality of the baffle wall structures is located between adjacent ones of the plurality of light-emitting elements.

The display panel further includes a plurality of first auxiliary structures which are disposed between the first substrate and at least a part of the light-emitting elements.

The plurality of first auxiliary structures and gaps are alternated in a direction parallel to the first substrate, and each of the gaps is a space between a respective one of the plurality of baffle wall structures and the first substrate.

In a second respect, the embodiments of the present disclosure also provide a display device which includes the display panel described in the first respect.

According to the embodiments of the present disclosure, the baffle wall structures are disposed around the light-emitting elements. Mutual crosstalk among light emitted by the adjacent light-emitting elements is prevented through the baffle wall structures. Furthermore, the first auxiliary structures are disposed between at least a part of the light-emitting elements and the first substrate. Heights of the light-emitting elements are raised by the first auxiliary structures so that the light-emitting elements are far away from the gaps between lower surfaces of the baffle wall structures and the first substrate, thereby reducing the mutual crosstalk among the light emitted by the adjacent light-emitting elements through the gaps and improving the display effect of the display panel.

DETAILED DESCRIPTION

Figure 1:
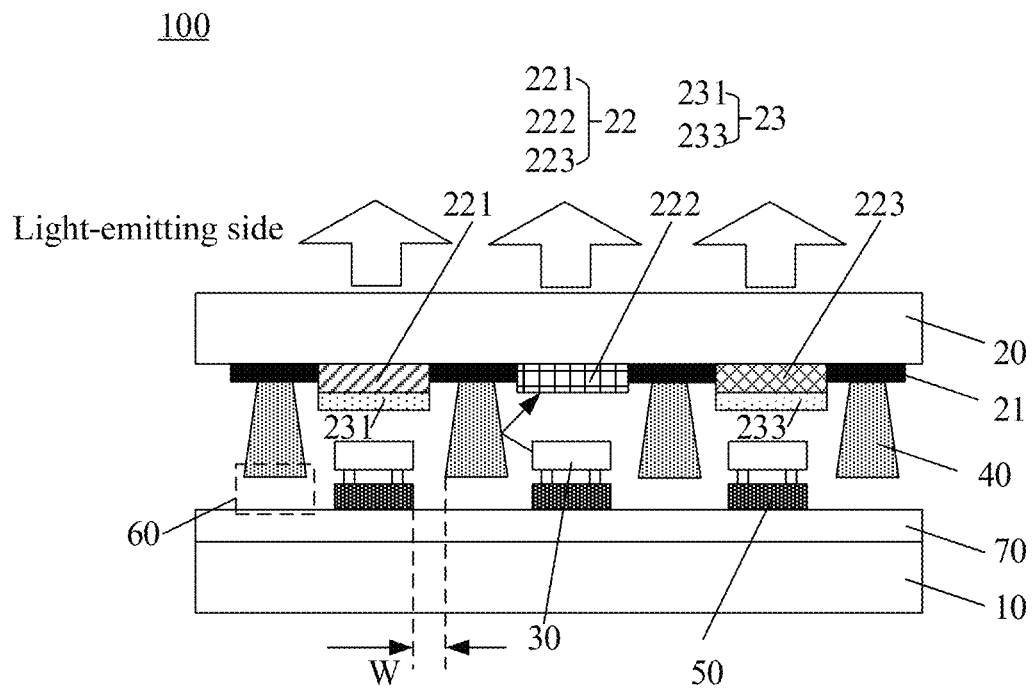
FIG. 1 is a structure diagram of a display panel according to an embodiment of the present disclosure.

The present disclosure is further described below in detail in conjunction with drawings and embodiments. It is to be understood that the embodiments set forth below are intended to merely illustrate the present disclosure and not to limit the present disclosure. It is to be noted that to facilitate description, merely part, not all, of structures related to the present disclosure are illustrated in the drawings.

It is to be noted that if not in collision, the embodiments described below may be combined with each other.

Based on the problem in the BACKGROUND, embodiments of the present disclosure provide a display panel. Exemplarily, FIG. 1 is a structure diagram of a display panel according to an embodiment of the present disclosure. As shown in FIG. 1, a display panel 100 provided by the embodiments of the present disclosure includes a first substrate 10 and a second substrate 20 which are disposed opposite each other. The display panel 100 further includes a plurality of light-emitting elements 30, a plurality of baffle wall structures 40, and a plurality of first auxiliary structures 50. The plurality of light-emitting elements 30 and the plurality of baffle wall structures 40 are located between the first substrate 10 and the second substrate 20. The plurality of light-emitting elements 30 are disposed on the first substrate 10, the plurality of baffle wall structures 40 are disposed on the second substrate 20, and a baffle wall structure 40 is located between adjacent light-emitting elements 30. The plurality of first auxiliary structures 50 are disposed between at least a part of light-emitting elements 30 and the first substrate 10. The first auxiliary structures 50 and gaps 60 are alternated in a direction which is parallel to the first substrate 10, and the gap 60 is a space between the baffle wall structure 40 and the first substrate 10.

For example, a light-emitting element 30 may be a mini-light-emitting diode (mini-LED) or a micro-light-emitting diode (microLED) and the like, and the type of the light-emitting element 30 is not limited in this embodiment.

In one embodiment, baffle wall structures 40 are disposed around light-emitting elements 30 to prevent mutual crosstalk among light emitted by the adjacent light-emitting elements 30. However, in consideration of the influence of such factors as the fluctuation in the height of the baffle wall structure 40 caused by the manufacturing process and the error in bonding the first substrate 10 and the second substrate 20, it is possible to cause a distance between a lower surface of the baffle wall structure 40 (a surface on the side away from the second substrate 20) and the first substrate 10, that is, the gap 60 in FIG. 1. In this case, the light emitted by the light-emitting element 30 is transmitted through the gap 60 and thus, mutual crosstalk among light beams emitted by the adjacent light-emitting elements 30 still exists. Therefore, the embodiment of the present disclosure provides the first auxiliary structures 50 between at least a part of the light-emitting elements 30 and the first substrate 10. Heights of the light-emitting elements 30 are raised through the first auxiliary structures 50 so that the light-emitting elements 30 are far away from the gaps 60. Thus, the mutual crosstalk among the light emitted by the adjacent light-emitting elements 30 through the gaps 60 is reduced.

It is to be noted that the embodiment of the present disclosure does not limit a method of forming the first auxiliary structure 50. Exemplarily, a first auxiliary structure layer is formed on the first substrate 10 and then the first auxiliary structure layer is etched to form the plurality of first auxiliary structures 50. It is to be understood that in order to achieve the electrical connection between the light-emitting element 30 and a signal transmission unit disposed on the first substrate 10, the first auxiliary structure 50 further includes a via hole (not shown in the figure) through which the light-emitting element 30 is electrically connected to the signal transmission unit so that a signal transmitted on the signal transmission unit drives the light-emitting element 30 to emit light.

It is to be noted that the display panel 100 in the embodiment of the present disclosure may adopt an active matrix driving mode or a passive matrix driving mode. When the display panel 100 adopts the active matrix driving mode, the display panel 100 further includes a pixel circuit layer 70 located between the first auxiliary structures 50 and the first substrate 10. The pixel circuit layer 70 includes a plurality of pixel circuits (not shown in the figure) which are electrically connected to the light-emitting elements 30 through the via holes of the first auxiliary structures 50 and are used for driving the light-emitting elements 30 to emit light. On the premise that the above-mentioned functions can be implemented, a specific structure of a pixel circuit is not specifically limited by the embodiment of the present disclosure. It is to be understood that the pixel circuit is the preceding signal transmission unit. When the display panel 100 adopts the passive matrix driving mode, the first substrate 10 is provided with a plurality of signal wires which provide signals for the light-emitting elements 30. The signal wires are electrically connected to the light-emitting elements 30 through the via holes of the first auxiliary structures 50. A specific driving mode is not limited in the embodiment of the present disclosure. It is to be understood that a signal wire is the preceding signal transmission unit. FIG. 1 illustrates an example in which the display panel 100 adopts the active matrix driving mode. The embodiments described below also adopt the active matrix driving mode, which will not be repeated.

It is to be understood that the gap 60 is a space between the baffle wall structure 40 and the surface of the first substrate 10 closest to the first auxiliary structure 50 when another film is disposed between the first substrate 10 and the first auxiliary structure 50. Exemplarily, when the display panel further includes the pixel circuit layer 70, the gap 60 is a space between the baffle wall structure 40 and the surface of the pixel circuit layer 70 closest to the first auxiliary structure 50.

It is to be understood that the plurality of light-emitting elements 30 may include a plurality of light-emitting elements emitting different colors of light, for example, a red light-emitting element, a green light-emitting element, and a blue light-emitting element for emitting red light, green light, and blue light respectively to display a color picture. The plurality of light-emitting elements 30 may also include a plurality of light-emitting elements emitting the same color of light. For example, the color of the light emitted by the plurality of light-emitting elements 30 is white. In one embodiment, the second substrate 20 is further provided with a black matrix 21 and a color resist layer 22 when the color of the light emitted by the light-emitting element 30 is white. The color resist layer includes a red color resist block 221, a blue color resist block 222, and a green color resist block 223. Thus, after white light passes through the red color resist block 221, red light is transmitted; after the white light passes through the blue color resist block 222, blue light is transmitted; and after the white light passes through the green color resist block 223, green light is transmitted. In one embodiment, the second substrate 20 is further provided with a color conversion layer when the color of the light emitted by the light-emitting element is blue. For example, the color conversion layer may include a film having a color conversion function such as a quantum dot layer or a fluorescent material layer. FIG. 1 illustrates an example in which the color conversion layer includes a quantum dot layer 23. When the color conversion layer includes the quantum dot layer 23, the quantum dot layer 23 includes, for example, a red quantum dot 231 and a green quantum dot 233. Blue light passes through the red quantum dot 231 and red light is emitted, and the blue light passes through the green quantum dot 233 and green light is emitted. Thus, a color picture is displayed. When the color conversion layer is disposed on the second substrate 20, the black matrix 21 and the color resist layer 22 may also be disposed on the second substrate 20 as shown in FIG. 1.

It is to be noted that the first auxiliary structures 50 are disposed between at least a part of the light-emitting elements 30 and the first substrate 10, which refers to that the first auxiliary structures 50 are disposed between all light-emitting elements 30 and the first substrate 10 or that the first auxiliary structures 50 are disposed between a part of the light-emitting elements 30 and the first substrate 10. This is not specifically limited in this embodiment and may be configured in various ways according to the actual situation.

In one embodiment, with continued reference to FIG. 1, along a direction which is perpendicular to the first substrate 10, a sectional shape of the baffle wall structure includes a regular trapezoid.

The regular trapezoid refers to that the size of the baffle wall structure 40 is larger and larger along a direction of the second substrate 20 pointing to the first substrate 10. That is, the short side of the trapezoid is located on the side facing towards the second substrate 20 while the long side of the trapezoid is located on the side of the short side away from the second substrate 20. In other words, the baffle wall structure 40 is disposed upside down on the second substrate 20. Exemplarily, the light-emitting element 30 emits light in all directions when the light-emitting element is the mini-LED or the microLED. The sectional shape of the baffle wall structure 40 is configured to be the regular trapezoid so that light transmitted to a sidewall of the baffle wall structure 40 can be reflected to a light-emitting side instead of to the first substrate 10, and a light utilization rate of the light-emitting element 30 can be improved.

In one embodiment, with continued reference to FIG. 1, in the direction which is parallel to the first substrate 10, a distance between the baffle wall structure 40 and the first auxiliary structure 50 is W and the reference W satisfies the condition 2 µm≤W≤8 µm.

The distance between the baffle wall structure 40 and the first auxiliary structure 50 is configured to be between 2 µm and 8 µm. That is, when the first substrate 10 and the second substrate 20 are aligned and bonded to each other, contact between the baffle wall structure 40 and the first auxiliary structure 50 and/or the light-emitting element 30 will not be caused by a process error or the like when the distance between the baffle wall structure 40 and the first auxiliary structure 50 is too small. In one embodiment, a space between the light-emitting element 30 and the baffle wall structure 40 will not be too large when the distance between the baffle wall structure 40 and the first auxiliary structure 50 is too large so that no more light will be transmitted through the gap 60. In this manner, the mutual crosstalk among the light emitted by the adjacent light-emitting elements 30 will not be caused and the resolution of the display panel will not be reduced. Therefore, in this embodiment, the distance W between the baffle wall structure 40 and the first auxiliary structure 50 may be configured to be that 2 µm≤W≤ 8 µm so that it is ensured that no contact exists between the baffle wall structure 40 and the first auxiliary structure 50 and/or the light-emitting element 30, the mutual crosstalk among the light emitted by the adjacent light-emitting elements 30 can be reduced, and the resolution of the display panel will not be affected.

For the display panel provided by the embodiment of the present disclosure, the baffle wall structures are disposed around the light-emitting elements. The mutual crosstalk among the light emitted by the adjacent light-emitting elements is prevented through the baffle wall structures. The first auxiliary structures are further disposed between at least a part of the light-emitting elements and the first substrate. Heights of the light-emitting elements are raised by the first auxiliary structures so that the light-emitting elements are far away from the gaps between lower surfaces of the baffle wall structures and the first substrate. Thus, the mutual crosstalk among the light emitted by the adjacent light-emitting elements through the gaps is reduced and the display effect of the display panel is improved.

Figure 2:
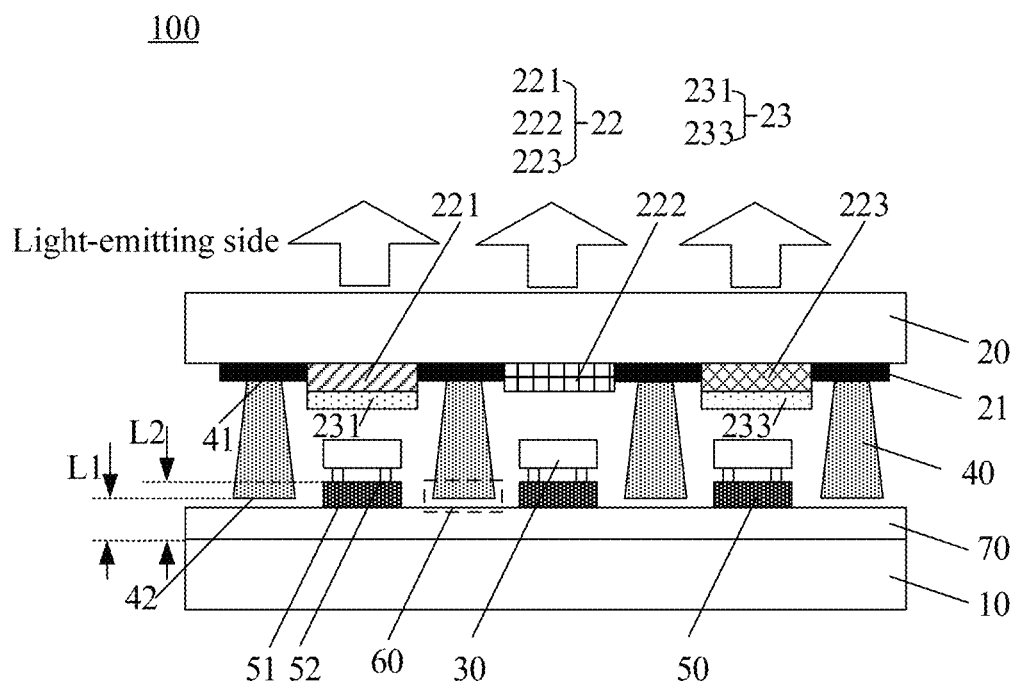
FIG. 2 is a structure diagram of another display panel according to an embodiment of the present disclosure.

In one embodiment, FIG. 2 is a structure diagram of another display panel according to an embodiment of the present disclosure. As shown in FIG. 2, in a direction which is perpendicular to a plane on which the first substrate 10 is located, the first auxiliary structure 50 includes a first surface 51 and a second surface 52 which are disposed opposite each other. The first surface 51 is located on a side of the second surface 52 facing towards the first substrate 10. The baffle wall structure includes a third surface 41 and a fourth surface 42 which are disposed opposite each other. The third surface 41 is located on a side of the fourth surface 42 facing towards the second substrate 20.

In this embodiment, relative to the second surface, the first surface is a surface of the first auxiliary structure facing towards the first substrate. Relative to the fourth surface, the third surface is a surface of the baffle wall structure facing towards the second substrate. That is to say, for each first auxiliary structure, the first surface is closer to the first substrate than the second surface is, and for each baffle wall structure, the third surface is closer to the second substrate than the fourth surface is.

In this embodiment, with continuing reference to FIG. 2, the pixel circuit layer 70 is located between the first auxiliary structures 50 and the first substrate 10. A distance L1 from the fourth surface 42 to the plane on which the pixel circuit layer 70 is located is less than a distance L2 from the second surface 52 to the plane on which the pixel circuit layer 70 is located. That is, the second surface 52 is located on the side of the fourth surface 42 facing towards the second substrate 20. That is, in the direction which is perpendicular to the first substrate, the light-emitting element 30 is located above the gap 60 so that it is possible to further reduce the mutual crosstalk among the light emitted by the adjacent light-emitting elements 30 through the gap 60.

Figure 3:
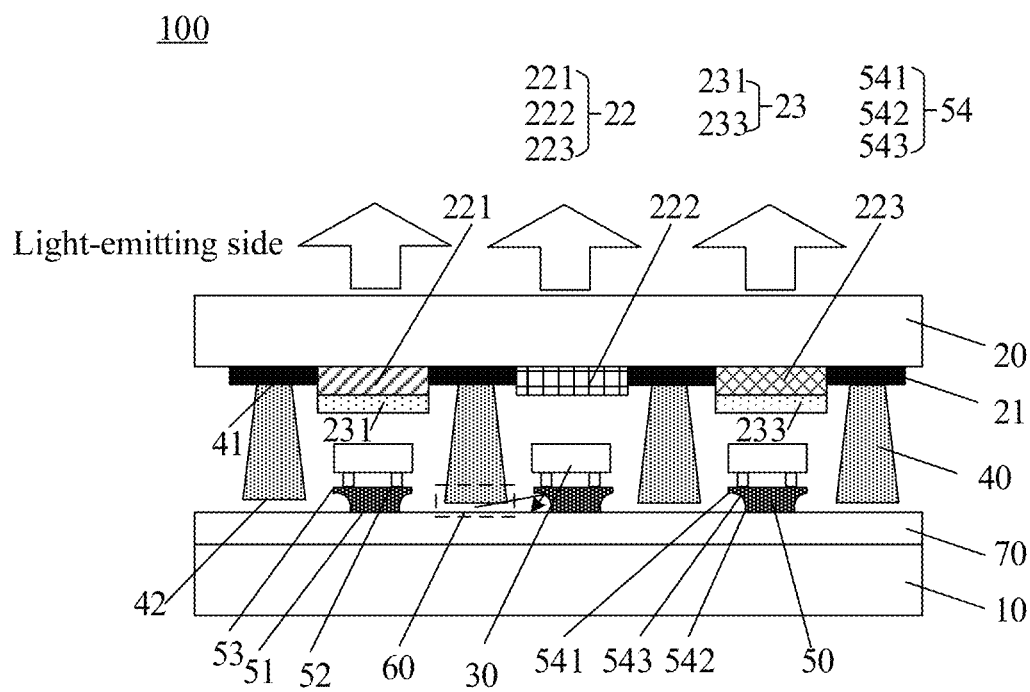
FIG. 3 is a structure diagram of another display panel according to an embodiment of the present disclosure.
Figure 4:
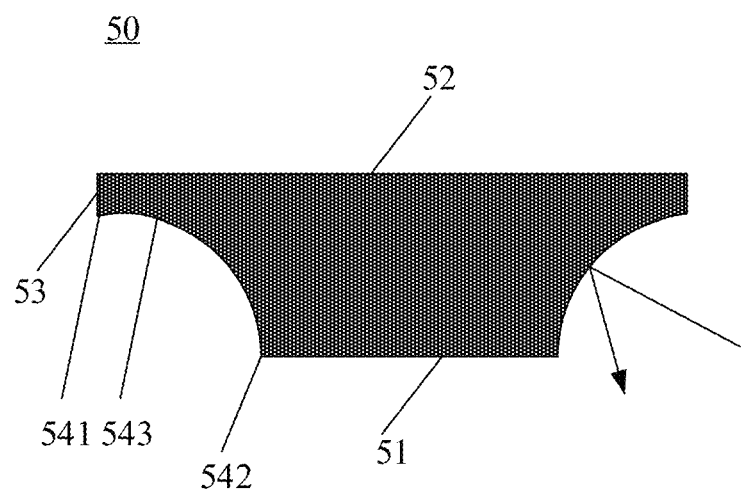
FIG. 4 is an enlarged view of a first auxiliary structure in FIG. 3.
Figure 5:
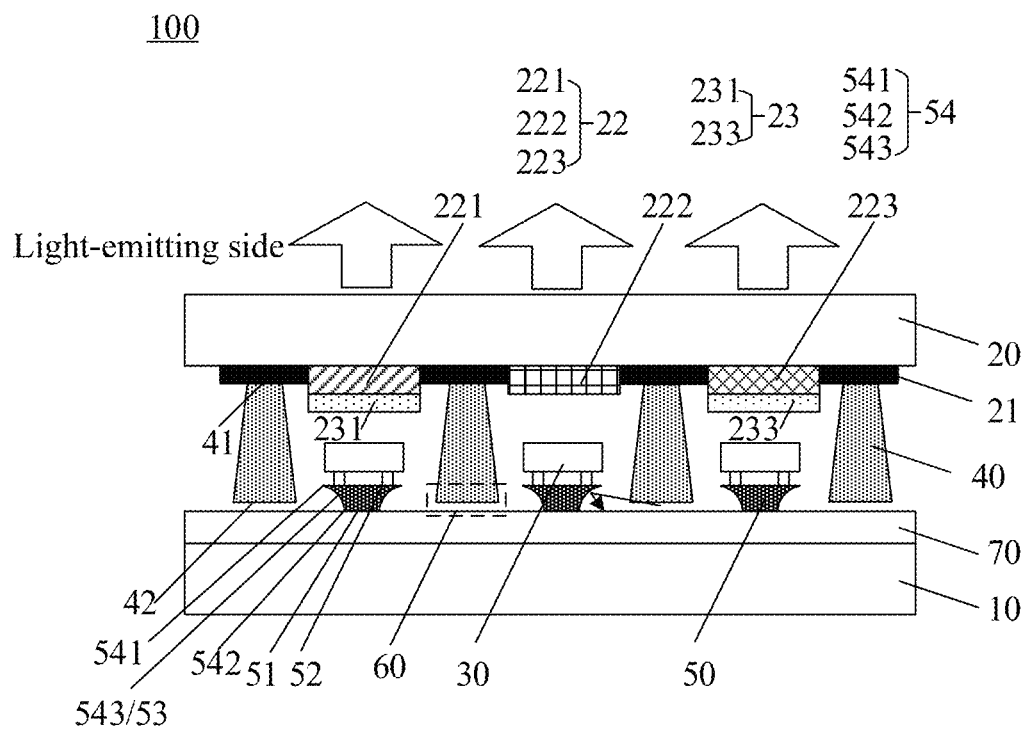
FIG. 5 is a structure diagram of another display panel according to an embodiment of the present disclosure.
Figure 6:
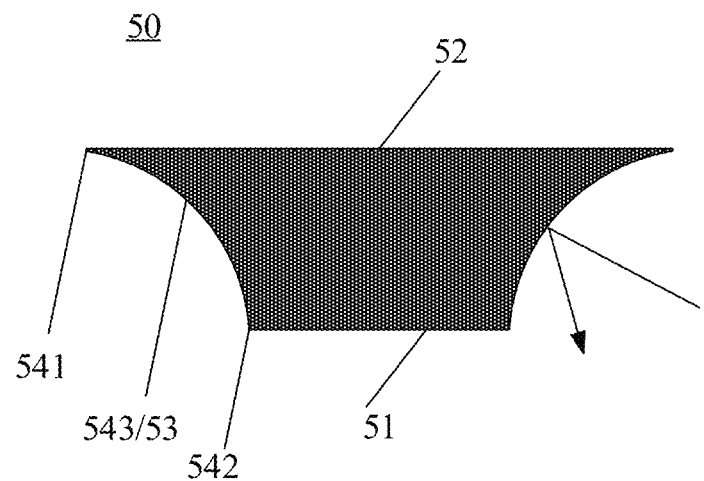
FIG. 6 is an enlarged view of a first auxiliary structure in FIG. 5.

In one embodiment, FIG. 3 is a structure diagram of another display panel according to an embodiment of the present disclosure. FIG. 4 is an enlarged view of a first auxiliary structure in FIG. 3. As shown in FIGS. 3 and 4, in the direction which is perpendicular to the plane on which the first substrate 10 is located, the first auxiliary structure 50 includes the first surface 51 and the second surface 52 which are disposed opposite each other. The first surface 51 is located on the side of the second surface 52 facing towards the first substrate 10. The first auxiliary structure 50 further includes a sidewall 53 which connects the first surface 51 to the second surface 52. A notch structure 54 is disposed on the first auxiliary structure 50. The notch structure 54 includes a first end 541, a second end 542, and a concave surface 543 which connects the first end 541 to the second end 542. The concave surface 543 is recessed away from the baffle wall structure 40 and toward the interior of the first auxiliary structure 50 along a direction of the baffle wall structure 40 pointing to a light-emitting element 30. The first end 541 is located on the sidewall 53, the second end 542 is located on the first surface 51, and the second end 542 is located on a side of the first end 541 away from the baffle wall structure 40. In one embodiment, FIG. 5 is a structure diagram of another display panel according to an embodiment of the present disclosure. FIG. 6 is an enlarged view of a first auxiliary structure in FIG. 5. As shown in FIGS. 5 and 6, the sidewall 53 is the concave surface 543. The first end 541 is located at a junction between the second surface 52 and the sidewall 53, the second end 542 is located at a junction between the first surface 51 and the sidewall 53, and the second end 542 is located on the side of the first end 541 away from the baffle wall structure 40.

In this embodiment, the first auxiliary structure 50 is configured to include the notch structure 54, and the concave surface 543 of the notch structure 54 is recessed away from the baffle wall structure 40 and toward the interior of the first auxiliary structure 50. In this manner, when the light emitted by the light-emitting element 30 is transmitted through the gap 60 to the first auxiliary structure 50 to which an adjacent light-emitting element 30 of the light-emitting element 30 corresponds, the light can be reflected toward the first substrate 10 rather than toward the direction in which the adjacent light-emitting element 30 of the light-emitting element 30 emits light. Thus, the mutual crosstalk among the light emitted by the adjacent light-emitting elements 30 can be further avoided.

Figure 7:
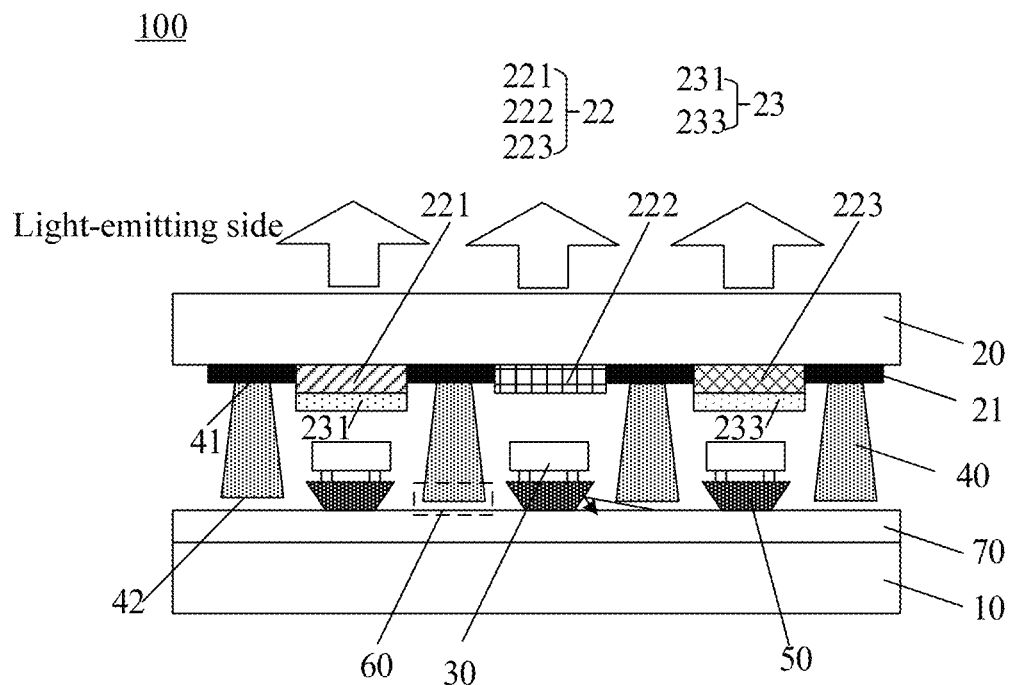
FIG. 7 is a structure diagram of another display panel according to an embodiment of the present disclosure.

In one embodiment, FIG. 7 is a structure diagram of another display panel according to an embodiment of the present disclosure. As shown in FIG. 7, along the direction which is perpendicular to the first substrate 10, a sectional shape of the first auxiliary structure 50 includes an inverted trapezoid.

The inverted trapezoid refers to that the size of the baffle wall structure 40 is smaller and smaller along the direction of the second substrate 20 pointing to the first substrate 10. That is, in the pair of parallel sides, the short side of the trapezoid is in contact with the first substrate 10 and the long side of the trapezoid is located on the side of the short side away from the first substrate 10.

In this embodiment, the first auxiliary structure 50 is configured to include the inverted trapezoid. In this manner, when the light emitted by the light-emitting element 30 is transmitted through the gap 60 to the first auxiliary structure 50 to which the adjacent light-emitting element 30 of the light-emitting element 30 corresponds, the light can be reflected toward the first substrate 10 rather than toward the direction in which the adjacent light-emitting element 30 of the light-emitting element 30 emits light. Thus, the mutual crosstalk among the light emitted by the adjacent light-emitting elements 30 can be further avoided.

Figure 8:
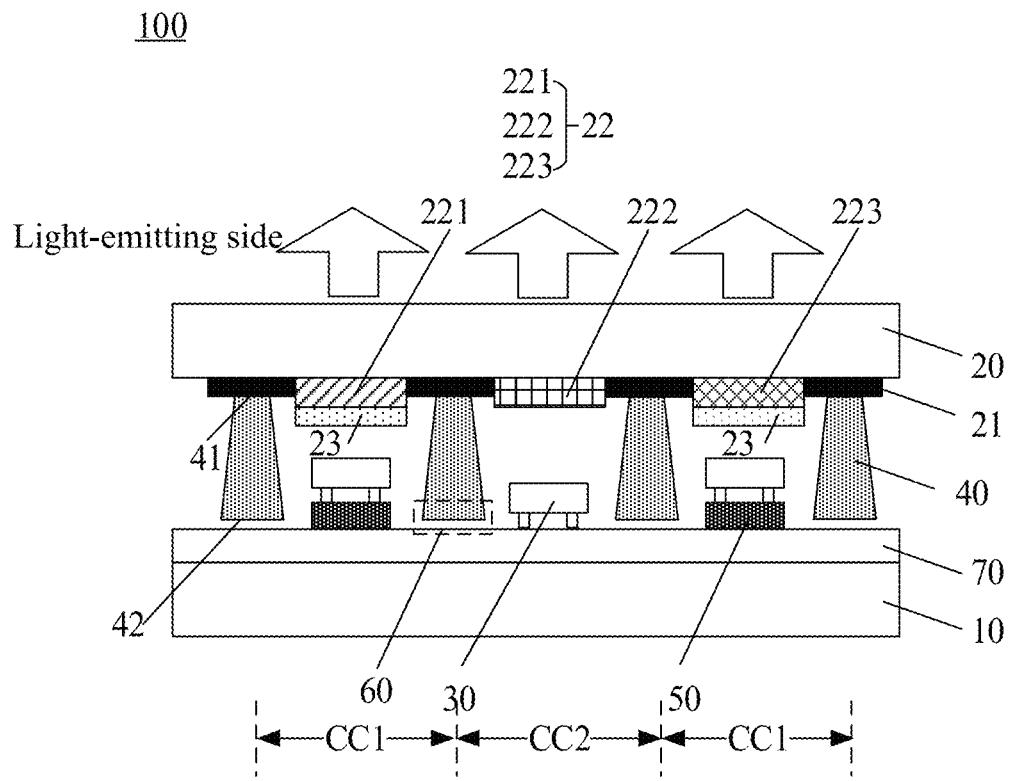
FIG. 8 is a structure diagram of another display panel according to an embodiment of the present disclosure.

In one embodiment, FIG. 8 is a structure diagram of another display panel according to an embodiment of the present disclosure. As shown in FIG. 8, the first substrate 10 includes a plurality of sub-pixel regions CC. The plurality of light-emitting elements 30 are in one-to-one correspondence with the plurality of sub-pixel regions CC. At least a part of the sub-pixel regions CC further include a color conversion layer. The color of the light emitted by the plurality of light-emitting elements 30 is a first color. The plurality of sub-pixel regions CC include a first sub-pixel region CC1 and a second sub-pixel region CC2. The first sub-pixel region CC1 includes the color conversion layer. The first auxiliary structure 50 is disposed between the light-emitting element 30 of the first sub-pixel region CC1 and the first substrate 10, and the first auxiliary structure 50 is not disposed between the light-emitting element 30 of the second sub-pixel region CC2 and the first substrate 10.

According to the preceding description, for example, the color conversion layer may include the film having the color conversion function such as the quantum dot layer or the fluorescent material layer. FIG. 8 illustrates an example in which the color conversion layer is the quantum dot layer 23.

Figure 9:
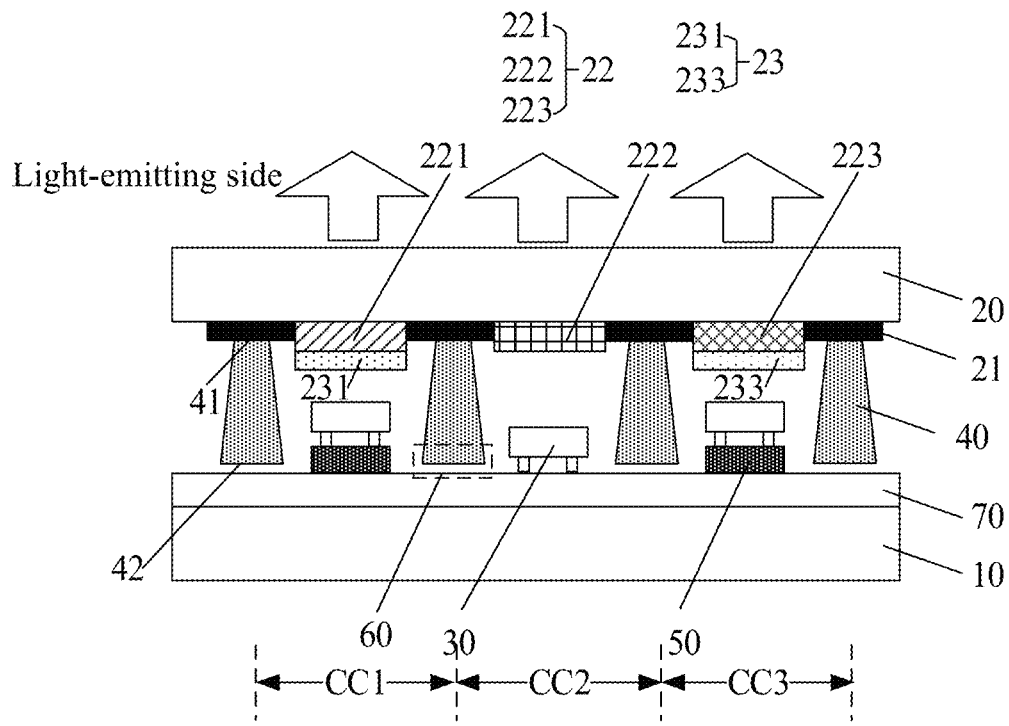
FIG. 9 is a structure diagram of another display panel according to an embodiment of the present disclosure.

It is to be noted that the plurality of sub-pixel regions CC may include a plurality of first sub-pixel regions CC1 and a plurality of second sub-pixel regions CC2, which does not constitute a limitation to the present application. In other embodiments, the plurality of sub-pixel regions may also include a plurality of first sub-pixel regions, a plurality of second sub-pixel regions, and a plurality of third sub-pixel regions. For example, FIG. 9 is a structure diagram of another display panel according to an embodiment of the present disclosure. As shown in FIG. 9, the plurality of sub-pixel regions CC may further include the plurality of first sub-pixel regions CC1, the plurality of second sub-pixel regions CC2, and the plurality of third sub-pixel regions CC3.

With continued reference to FIG. 8, exemplarily, the first color is blue; light emitted by the light-emitting element 30 located in the first sub-pixel region CC1 is converted by the quantum dot layer 23 to be red light or green light, that is, the corresponding color of the first sub-pixel region CC1 is red or green. However, the corresponding color of the second sub-pixel region CC2 is the color of the light emitted by the light-emitting element 30, that is, blue, because the second sub-pixel region CC2 is not provided with the quantum dot layer 23. When a red picture or a green picture needs to be displayed, display in the first sub-pixel region CC1 is needed and display in the second sub-pixel region CC2 is not needed. However, the light emitted from the light-emitting element 30 to which the first sub-pixel region CC1 corresponds may enter the second sub-pixel region CC2 through the gap 60. Since the second sub-pixel region CC2 is not provided with the quantum dot layer 23, the light which enters the second sub-pixel region CC2 through the gap 60 is directly emitted out from the light-emitting side. Therefore, even if the light-emitting element 30 to which the second sub-pixel region CC2 corresponds does not emit light, display exists in the second sub-pixel region CC2 in which no display is needed, that is, undesired blue light appears in the red picture or the undesired blue light appears in the green picture so that the display effect is affected. To solve this problem, in the embodiment of the present disclosure, the height of the light-emitting element 30 in the first sub-pixel region CC1 is raised through the first auxiliary structure 50 so that the light-emitting element 30 is far away from the gap 60. In this manner, the light of the light-emitting element 30 which enters the second sub-pixel region CC2 through the gap 60 can be reduced, and the undesired light-emission problem is reduced.

With continued reference to FIG. 9, exemplarily, the first color is blue, and for example, the quantum dot layer 23 includes a red quantum dot 231 located in the first sub-pixel region CC1 and a green quantum dot 233 located in the third sub-pixel region CC3. The light emitted by the light-emitting element 30 located in the first sub-pixel region CC1 is converted by the red quantum dot 231 to be red light, and the light emitted by the light-emitting element 30 located in the third sub-pixel region CC3 is converted by the green quantum dot 233 to be green light. That is, the color to which the first sub-pixel region CC1 corresponds is red and the color to which the third sub-pixel region CC3 corresponds is green. Since the second sub-pixel region CC2 is not provided with the quantum dot, the color to which the second sub-pixel region CC2 corresponds is the color of the light emitted by the light-emitting element 30, that is, blue. When a red picture and a green picture need to be displayed, display in the first sub-pixel region CC1 and the third sub-pixel region CC3 is needed, and display in the second sub-pixel region CC2 is not needed. However, the light emitted by the light-emitting element 30 to which the first sub-pixel region CC1 corresponds and the light emitted by the light-emitting element 30 to which the third sub-pixel region CC3 corresponds may enter the second sub-pixel region CC2 through the gap 60. Since the second sub-pixel region CC2 is not provided with the quantum dot, the light which enters the second sub-pixel region CC2 through the gap 60 is directly emitted out from the light-emitting side. Therefore, even if the light-emitting element 30 to which the second sub-pixel region CC2 corresponds does not emit light, display exists in the second sub-pixel region CC2 in which no display is needed, that is, undesired blue light appears in the red picture and the green picture so that the display effect is affected. To solve this problem, in the embodiment of the present disclosure, the height of the light-emitting element 30 in the first sub-pixel region CC1 and the height of the light-emitting element 30 in the third sub-pixel region CC3 are raised through the first auxiliary structures 50 so that the light-emitting elements 30 are far away from the gaps 60. In this manner, the light of the light-emitting element 30 in the first sub-pixel region CC1 and the light of the light-emitting element 30 in the third sub-pixel region CC3 which enter the second sub-pixel region CC2 through the gaps 60 can be reduced, and the undesired light-emission problem is reduced.

Figure 10:
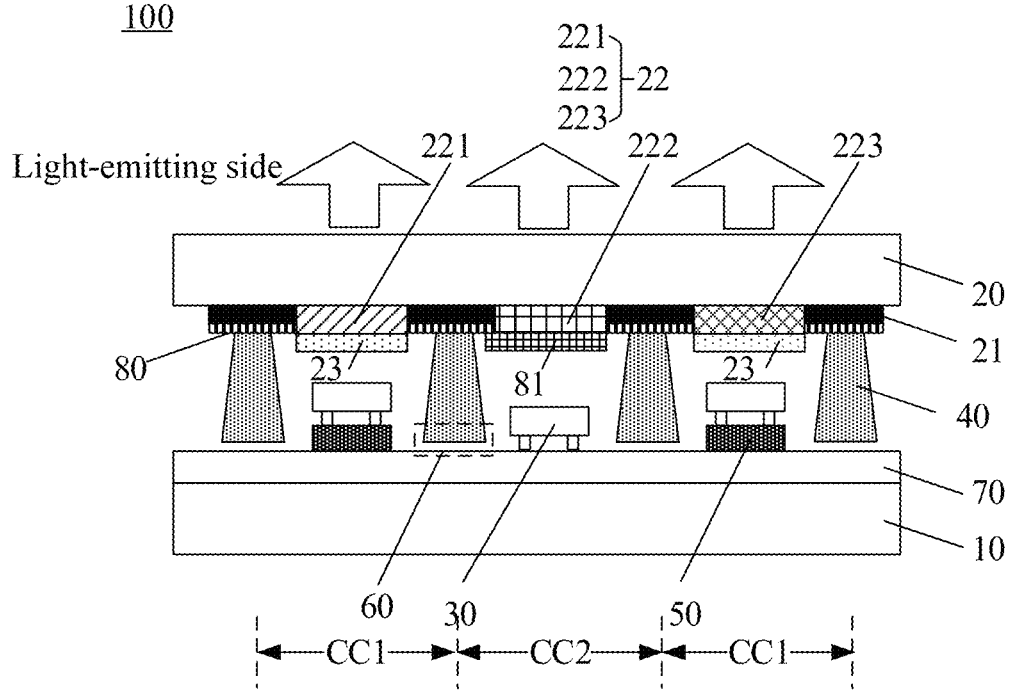
FIG. 10 is a structure diagram of another display panel according to an embodiment of the present disclosure.

Based on the above-mentioned solutions, In one embodiment, FIG. 10 is a structure diagram of another display panel according to an embodiment of the present disclosure. As shown in FIG. 10, the display panel 100 provided by the embodiment of the present disclosure further includes a plurality of touch electrodes 80 and a transparent auxiliary electrode 81. A touch electrode 80 is located between the baffle wall structure 40 and the second substrate 20. A vertical projection of the touch electrode 80 on the plane on which the first substrate 10 is located and a vertical projection of the baffle wall structure 40 on the plane on which the first substrate 10 is located at least partially overlap each other. The transparent auxiliary electrode 81 is located in the second sub-pixel region CC2 and is disposed on the second substrate 20. In addition, the transparent auxiliary electrode 81 is electrically connected to the touch electrode 80 which is adjacent to the transparent auxiliary electrode 81.

Touch modes of the display panel are generally divided into three types: a mutual capacitive touch mode in which a touch driving electrode and a touch sensing electrode are disposed at the same layer, a mutual capacitive touch mode in which the touch driving electrode and the touch sensing electrode are disposed at different layers, and a self-capacitive touch mode. The touch electrode 80 in the preceding description is generally in the self-capacitive touch mode. It is to be understood that when the display panel is in the self-capacitive touch mode, the display panel 100 includes the plurality of touch electrodes 80 which are not electrically connected to each other and are electrically connected to corresponding chips through touch wires (not shown in the figure), respectively, to receive touch signals, respectively.

Since the second sub-pixel region CC2 is not provided with the first auxiliary structure 50, the distance between the light-emitting element 30 of the second sub-pixel region CC2 and the second substrate 20 is greater than the distance between the light-emitting element 30 of the first sub-pixel region CC1 and the second substrate 20, that is, a larger space exists between the light-emitting element 30 of the second sub-pixel region CC2 and the second substrate 20. Based on this, in this embodiment, the transparent auxiliary electrode 81 is disposed in the second sub-pixel region CC2 and on the second substrate 20. The transparent auxiliary electrode 81 and the touch electrode 80 which is adjacent to the transparent auxiliary electrode 81 overlap each other. Thus, an effective area of the touch electrode 80 is increased and touch performance is improved.

It is to be understood that since the transparent auxiliary electrode 81 is made of a transparent material, the light emitted by the light-emitting element 30 is not blocked, that is, the display of the display panel 100 is not affected.

Figure 11:
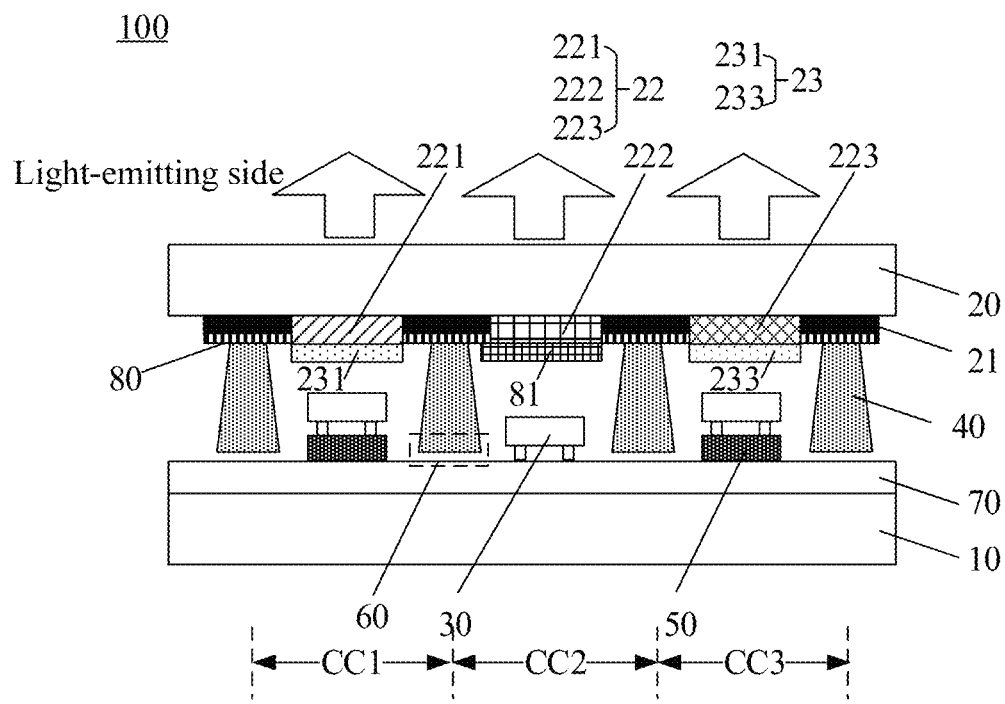
FIG. 11 is a structure diagram of another display panel according to an embodiment of the present disclosure.

It is to be noted that FIG. 10 illustrates merely an example in which the plurality of sub-pixel regions CC may include the plurality of first sub-pixel regions CC1 and the plurality of second sub-pixel configuration regions CC2. This solution is also applicable when the plurality of sub-pixel regions CC may also include the plurality of first sub-pixel regions CC1, the plurality of second sub-pixel regions CC2, and the plurality of third sub-pixel regions CC3. For example, referring to FIG. 11, since the principle is the same, specifically, reference may be made to the above explanation and details are not repeated here.

In one embodiment, with continued reference to FIG. 10, when the display panel 100 includes the black matrix 21 and the color resist block 23, the touch electrode 80 is disposed between the black matrix 21 and the baffle wall structure 40. The transparent auxiliary electrode 81 is disposed on the side of the color resist block 22 away from the second substrate 20. The vertical projection of the touch electrode 80 on the plane on which the first substrate 10 is located is within the vertical projection of the black matrix 21 on the plane on which the first substrate 10 is located. For example, the specific manufacturing method may be described below: the black matrix 21 is disposed on the second substrate 20, the color resist block 23 is disposed at the opening position to which the black matrix 21 corresponds, the touch electrode 80 is disposed on the side of the black matrix 21 away from the second substrate 20, and the vertical projection of the touch electrode 80 on the plane on which the first substrate 10 is located is within the vertical projection of the black matrix 21 on the plane on which the first substrate 10 is located; then the baffle wall structure 40 is disposed on the side of the touch electrode 80 away from the black matrix 21; next, a transparent touch electrode layer is disposed at the position of the color resist block 23 (the color resist block of the second sub-pixel region CC2), the transparent touch electrode layer is patterned to form the transparent auxiliary electrode 81, and the transparent auxiliary electrode 81 and the touch electrode 80 which is adjacent to the transparent auxiliary electrode 81 overlap each other. If the display panel 100 further includes the color conversion layer, the color conversion layer is disposed on the side of the transparent auxiliary electrode 81 away from the second substrate 20 after the transparent auxiliary electrode 81 is disposed.

Figure 12:
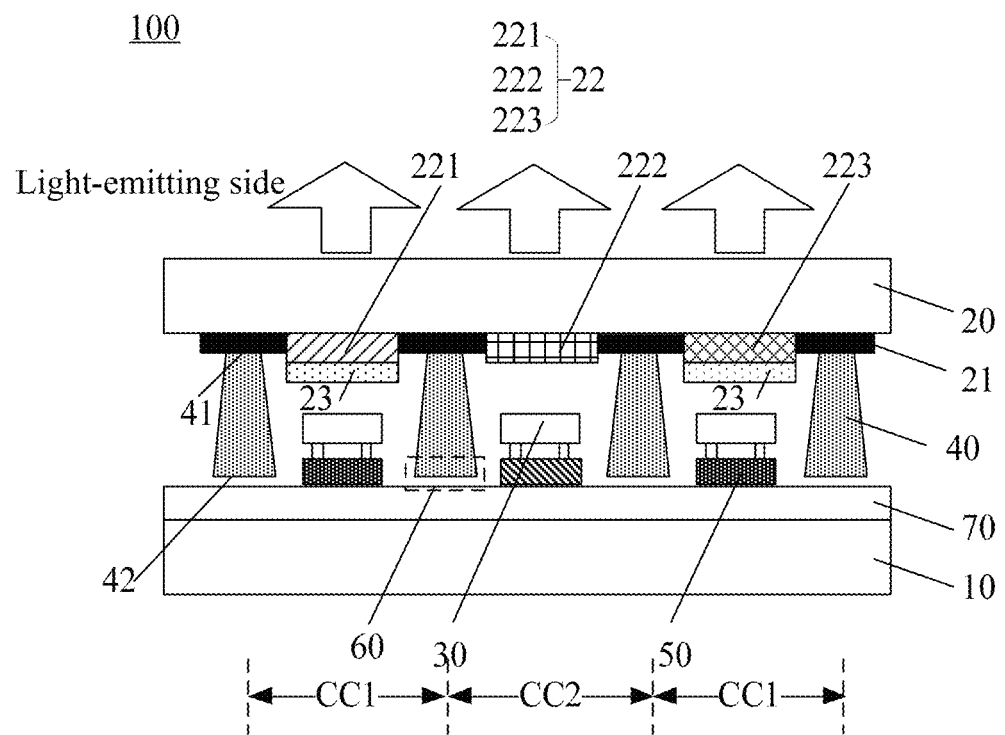
FIG. 12 is a structure diagram of another display panel according to an embodiment of the present disclosure.

In one embodiment, FIG. 12 is a structure diagram of another display panel according to an embodiment of the present disclosure. As shown in FIG. 12, the first substrate 10 includes the plurality of sub-pixel regions CC, the plurality of light-emitting elements 30 are in one-to-one correspondence with the plurality of sub-pixel regions CC, the plurality of sub-pixel regions CC include the first sub-pixel region CC1 and the second sub-pixel region CC2, the first auxiliary structure 50 is disposed between the light-emitting element 30 of the first sub-pixel region CC1 and the first substrate 10, and the first auxiliary structure 50 is disposed between the light-emitting element 30 of the second sub-pixel region CC2 and the first substrate 10.

That is, the first auxiliary structure 50 is disposed between each light-emitting element 30 and the first substrate 10 so that the light-emitting element 30 in each sub-pixel region CC can be far away from the gap 60. Thus mutual crosstalk among the light emitted from the adjacent light-emitting elements 30 through the gap 60 is reduced and the undesired light-emission problem is also reduced.

Figure 13:
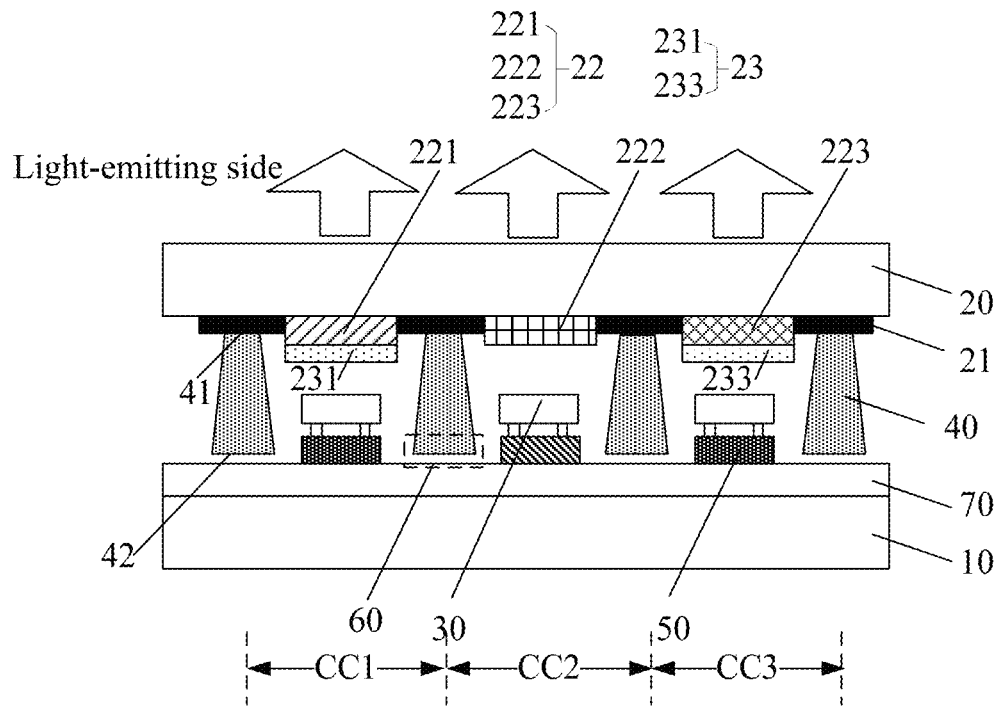
FIG. 13 is a structure diagram of another display panel according to an embodiment of the present disclosure.

Likewise, as described in the preceding embodiments, the plurality of sub-pixel regions CC may include the plurality of first sub-pixel regions CC1 and the plurality of second sub-pixel regions CC2. For example, the color to which the first sub-pixel region CC1 corresponds is green or red and for example, the color to which the second sub-pixel region CC2 corresponds is blue. In one embodiment, FIG. 13 is a structure diagram of another display panel according to an embodiment of the present disclosure. As shown in FIG. 13, the plurality of sub-pixel regions CC may further include the plurality of first sub-pixel regions CC1, the plurality of second sub-pixel regions CC2, and the plurality of third sub-pixel regions CC3. For example, the color to which the first sub-pixel region CC1 corresponds is red; for example, the color to which the second sub-pixel region CC2 corresponds is blue; and for example, the color to which the third sub-pixel region CC3 corresponds is green.

Based on the above-mentioned solutions, In one embodiment, with continued reference to FIG. 12, the first substrate 10 includes the plurality of sub-pixel regions CC; the plurality of light-emitting elements 30 are in one-to-one correspondence with the plurality of sub-pixel regions CC. The plurality of sub-pixel regions CC include the first sub-pixel region CC1 and the second sub-pixel region CC2. The luminescence efficiency of the first sub-pixel region CC1 is higher than the luminescence efficiency of the second sub-pixel region CC2. The first auxiliary structure 50 to which the first sub-pixel region CC1 corresponds includes a black material. The first auxiliary structure 50 to which the second sub-pixel region CC2 corresponds includes a white material or a transparent material.

It is to be understood that the black material can absorb light while the white material or transparent material can reflect light. According to the preceding description, when the light-emitting element 30 is the mini-LED or the micro-LED, the light-emitting element 30 emits light in all directions. A part of the light emitted by the light-emitting element 30 is towards the first auxiliary structure 50. If the first auxiliary structure 50 is made of the black material, the part of the light emitted by the light-emitting element 30 is absorbed. If the first auxiliary structure 50 is made of the white material or the transparent material, the part of the light emitted by the light-emitting element 30 is reflected.

When the first auxiliary structure 50 to which the first sub-pixel region CC1 corresponds and the first auxiliary structure 50 to which the second sub-pixel region CC2 corresponds are not configured to be differentiated, for example, the luminescence efficiency of the first sub-pixel region CC1 is higher than the luminescence efficiency of the second sub-pixel region CC2. Therefore, in this embodiment, the black material is selected as the material of the first auxiliary structure 50 to which the first sub-pixel region CC1 corresponds so that the part of light emitted by the light-emitting element 30 to which the first sub-pixel region CC1 corresponds is absorbed by the first auxiliary structure 50. The white material or the transparent material is selected as the material of the first auxiliary structure 50 to which the second sub-pixel region CC2 corresponds so that the part of light emitted by the light-emitting element 30 to which the second sub-pixel region CC2 corresponds is reflected by the first auxiliary structure 50. Thus, a light utilization rate of the second sub-pixel region CC2 is improved, the luminescence efficiency of the first sub-pixel region CC1 is enabled to tend to be consistent with the luminescence efficiency of the second sub-pixel region CC2, and the display effect of the display panel 100 is improved.

With continued reference to FIG. 13, the luminescence efficiency of the first sub-pixel region CC1 is higher than the luminescence efficiency of the second sub-pixel region CC2 and the luminescence efficiency of the third sub-pixel region CC3 is also higher than the luminescence efficiency of the second sub-pixel region CC2. The black material may be selected as the material of the first auxiliary structures 50 to which the first sub-pixel region CC1 and the third sub-pixel region CC3 correspond so that the part of light emitted by the light-emitting elements 30 to which the first sub-pixel region CC1 and the third sub-pixel region CC3 correspond is absorbed by the first auxiliary structures 50. The white material or the transparent material is selected as the material of the first auxiliary structure 50 to which the second sub-pixel region CC2 corresponds so that the part of light emitted by the light-emitting element 30 to which the second sub-pixel region CC2 corresponds is reflected by the first auxiliary structure 50. Thus, the light utilization rate of the second sub-pixel region CC2 is improved, the luminescence efficiency of the first sub-pixel region CC1, the luminescence efficiency of the second sub-pixel region CC2, and the luminescence efficiency of the third sub-pixel region CC3 are enabled to tend to be consistent, and the display effect of the display panel 100 is improved.

The materials of the first auxiliary structures 50 in the first sub-pixel region CC1 and the second sub-pixel region CC2 may be configured to be different to enable the luminous efficiency of the first sub-pixel region CC1 and the luminous efficiency of the second sub-pixel region CC2 to tend to be consistent. In one embodiment, the materials of the first auxiliary structures 50 in the first sub-pixel region CC1, the second sub-pixel region CC2, and the third sub-pixel region CC3 may be configured to be different to enable the luminous efficiency of the first sub-pixel region CC1, the luminous efficiency of the second sub-pixel region CC2, and the luminescence efficiency of the third sub-pixel region CC3 to tend to be consistent. Another method may also be adopted to enable the luminous efficiency of the first sub-pixel region CC1 and the luminous efficiency of the second sub-pixel region CC2 to tend to be consistent, or enable the luminous efficiency of the first sub-pixel region CC1, the luminous efficiency of the second sub-pixel region CC2, and the luminescence efficiency of the third sub-pixel region CC3 to tend to be consistent; such method is described below.

Figure 14:
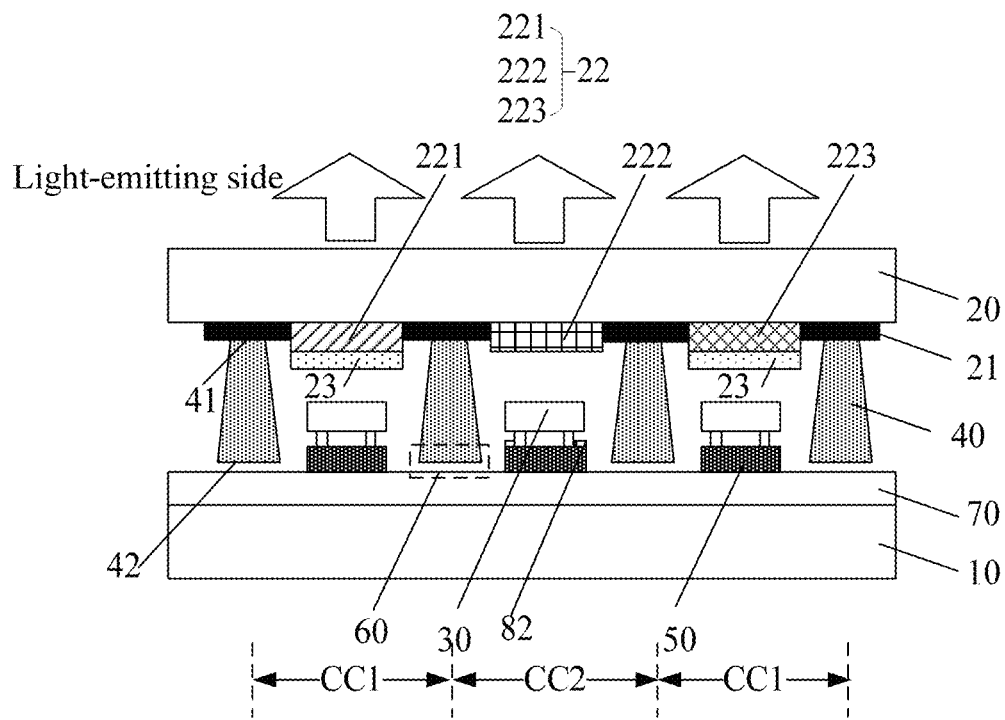
FIG. 14 is a structure diagram of another display panel according to an embodiment of the present disclosure.

In one embodiment, FIG. 14 is a structure diagram of another display panel according to an embodiment of the present disclosure. As shown in FIG. 14, the first substrate 10 includes the plurality of sub-pixel regions CC. The plurality of light-emitting elements 30 are in one-to-one correspondence with the plurality of sub-pixel regions CC. The plurality of sub-pixel regions CC include the first sub-pixel region CC1 and the second sub-pixel region CC2. The luminescence efficiency of the first sub-pixel region CC1 is higher than the luminescence efficiency of the second sub-pixel region CC2. A reflective structure 82 is disposed on a side of the first auxiliary structure 50 to which the second sub-pixel region CC2 corresponds away from the first substrate 10.

It is to be understood that the reflective structure 82 may reflect light. Therefore, when the first auxiliary structure 50 is provided with the reflective structure 82, the part of light emitted by the light-emitting element 30 can be reflected.

In one embodiment, the reflective structure 82 is disposed on the first auxiliary structure 50 to which the second sub-pixel region CC2 with relatively low luminescence efficiency corresponds so that the part of light emitted by the light-emitting element 30 to which the second sub-pixel region CC2 corresponds is reflected by the first auxiliary structure 50 to improve the light utilization rate of the second sub-pixel region CC2. However, the reflective structure 82 is not disposed on the first auxiliary structure 50 to which the first sub-pixel region CC1 with relatively high luminescence efficiency corresponds. Thus, the luminescence efficiency of the first sub-pixel region CC1 is enabled to tend to be consistent with the luminescence efficiency of the second sub-pixel region CC2 and the display effect of the display panel 100 is improved.

Figure 15:
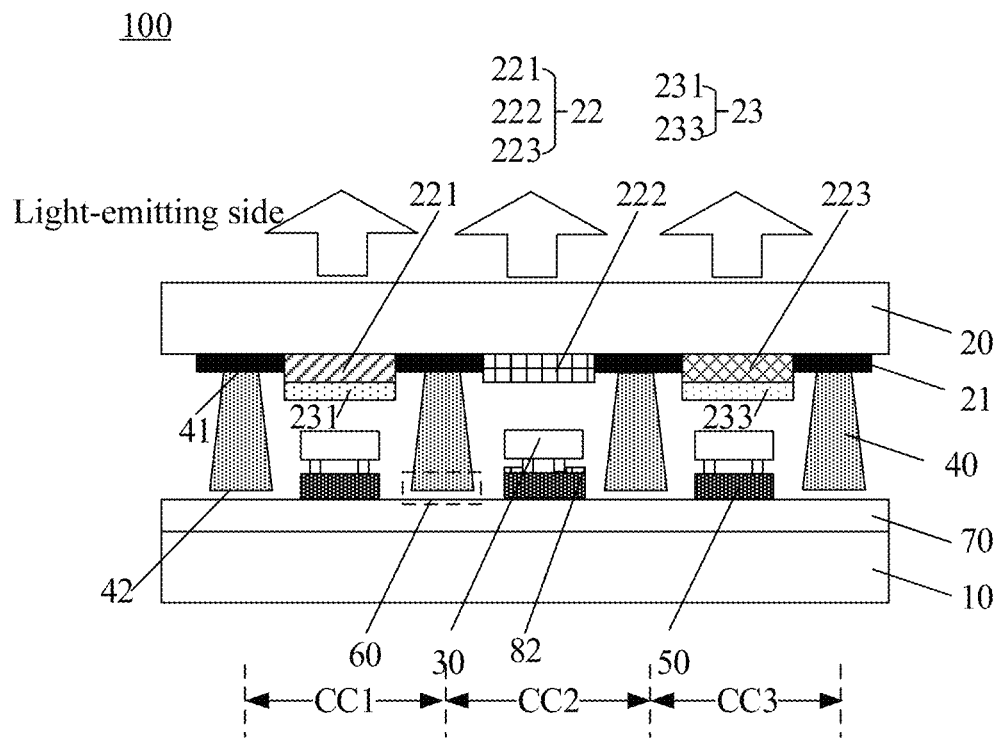
FIG. 15 is a structure diagram of another display panel according to an embodiment of the present disclosure.

Referring to FIG. 15, when the plurality of sub-pixel regions CC include the plurality of first sub-pixel regions CC1, the plurality of second sub-pixel regions CC2, and the plurality of third sub-pixel regions CC3, and the luminescence efficiency of the first sub-pixel region CC1 is higher than the luminescence efficiency of the second sub-pixel region CC2 and the luminescence efficiency of the third sub-pixel region CC3 is also higher than the luminescence efficiency of the second sub-pixel region CC2. The reflective structure 82 is disposed on the first auxiliary structure 50 to which the second sub-pixel region CC2 with relatively low luminescence efficiency corresponds so that the part of light emitted by the light-emitting element 30 to which the second sub-pixel region CC2 corresponds is reflected by the first auxiliary structure 50 to improve the light utilization rate of the second sub-pixel region CC2. However, the reflective structures 82 are not disposed on the first auxiliary structures 50 to which the third sub-pixel region CC3 and the first sub-pixel region CC1 with relatively high luminescence efficiency correspond. Thus, the luminescence efficiency of the first sub-pixel region CC1, the luminescence efficiency of the second sub-pixel region CC2, and the luminescence efficiency of the third sub-pixel region CC3 are enabled to tend to be consistent and the display effect of the display panel 100 is improved.

Figure 16:
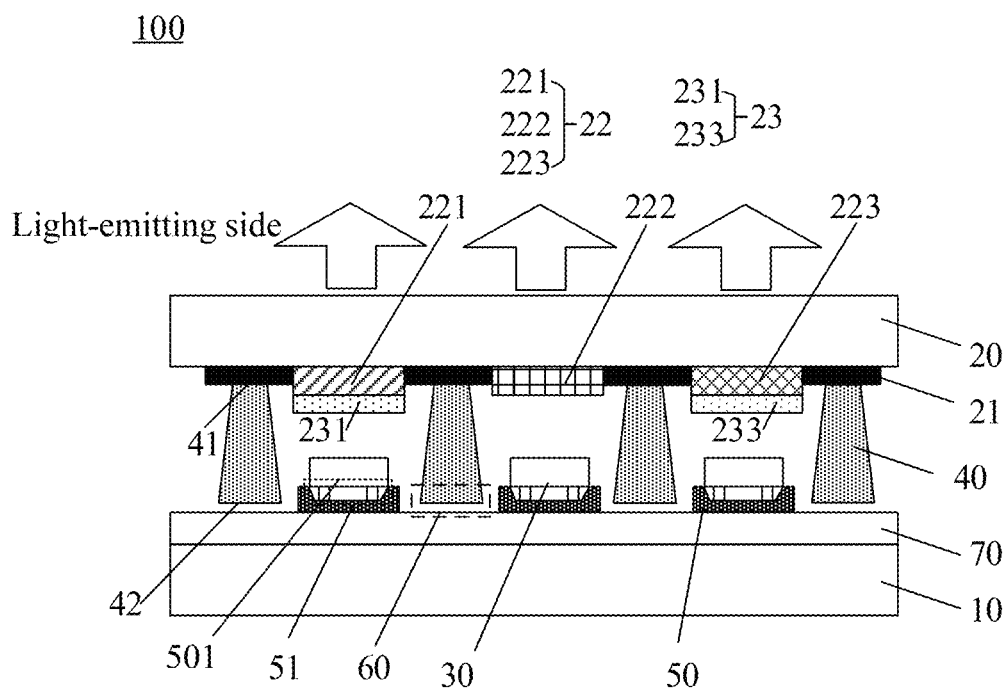
FIG. 16 is a structure diagram of another display panel according to an embodiment of the present disclosure.

Based on the above-mentioned solutions, In one embodiment, FIG. 16 is a structure diagram of another display panel according to an embodiment of the present disclosure. As shown in FIG. 16, the first auxiliary structure 50 includes a slot structure 501 and the light-emitting element 30 is located in the slot structure 501.

When the light-emitting element 30 is disposed in the slot structure 501, the slot structure 501 can block a part of light of the light-emitting element 30 and prevent the part of light from being transmitted through the gap 60 so that optical crosstalk between the adjacent light-emitting elements is reduced. In addition, since the light-emitting element 30 is recessed into the slot structure 501, the overall height of the light-emitting element 30 is reduced, which facilitates the lightness and thinness of the display panel 100.

Figure 17:
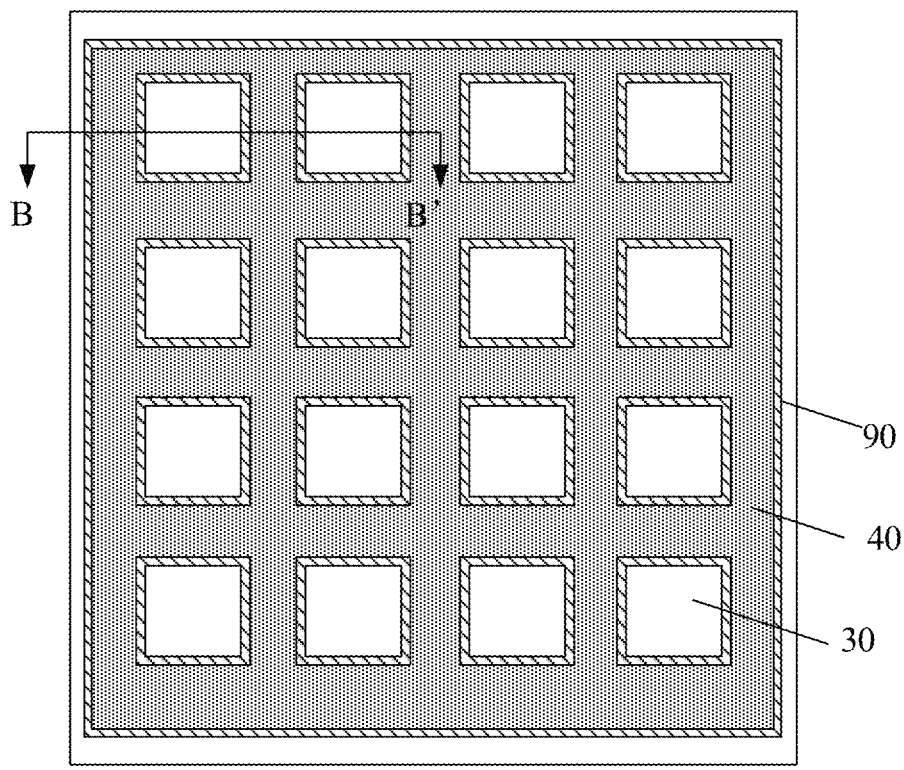
FIG. 17 is a top view of a display panel according to an embodiment of the present disclosure.
Figure 18:
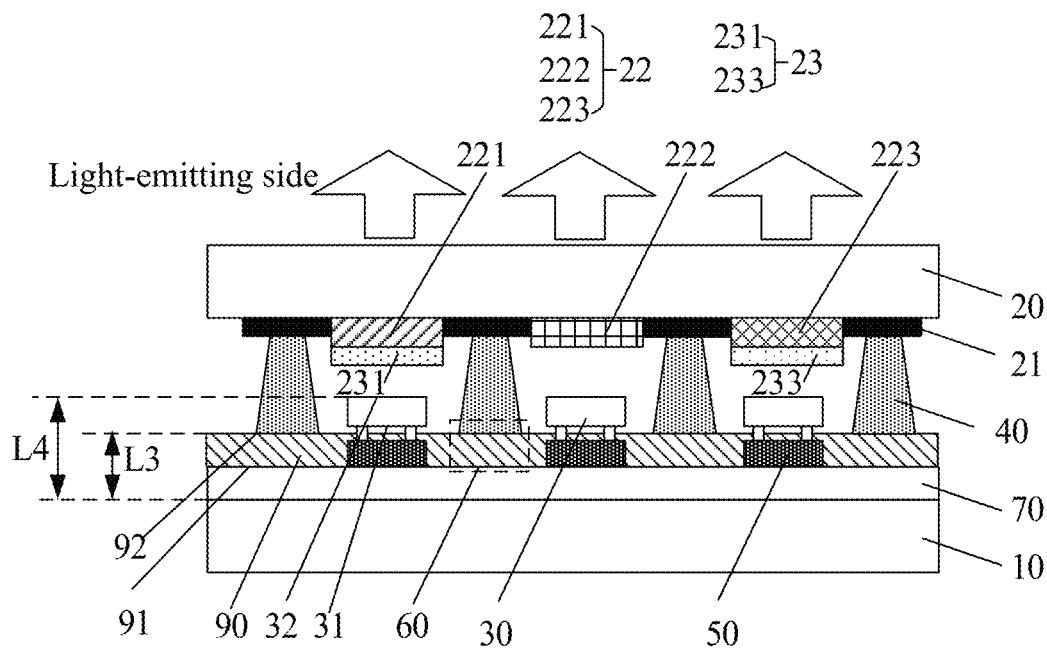
FIG. 18 is a cross-sectional view of FIG. 17 taken along a BB' direction according to an embodiment of the present disclosure.

Based on the above-mentioned solutions, In one embodiment, FIG. 17 is a top view of a display panel according to an embodiment of the present disclosure and FIG. 18 is a cross-sectional view of FIG. 17 taken along a BB' direction according to an embodiment of the present disclosure. The display panel 100 provided by the embodiment of the present disclosure further includes a second auxiliary structure 90 which is disposed around the light-emitting element 30. In the direction which is perpendicular to the plane on which the first substrate 10 is located, the second auxiliary structure 90 includes a fifth surface 91 and a sixth surface 92 which are disposed opposite each other. The fifth surface 91 is located on a side of the sixth surface 92 facing towards the first substrate 10. The light-emitting element 30 includes a seventh surface 31 and an eighth surface 32 which are disposed opposite each other. The seventh surface 31 is located on a side of the eighth surface 32 facing towards the first substrate 10. A distance L3 from the sixth surface 92 to the plane on which the first substrate 10 is located is less than a distance L4 from the eighth surface 32 to the plane on which the first substrate 10 is located.

In this embodiment, relative to the sixth surface, the fifth surface is a surface of the second auxiliary structure facing towards the first substrate. Relative to the eighth surface, the seventh surface is a surface of the light-emitting element facing towards the first substrate. That is to say, for each second auxiliary structure, the fifth surface is closer to the first substrate than the sixth surface is, and for each light-emitting element, the seventh surface is closer to the first substrate than the eighth surface is.

According to the preceding description, the display panel 100 in the embodiment of the present disclosure may adopt the active matrix driving mode or the passive matrix driving mode. Whether the active matrix driving mode or the passive matrix driving mode is adopted, a corresponding metal wire exists. In this embodiment, the second auxiliary structure 90 is disposed outside the region of the light-emitting element 30 to block reflection of the metal wire. Additionally, the second auxiliary structure 90 can also block a part of light of the light-emitting element 30 and prevent the part of light from being transmitted through the gap 60 so that the optical crosstalk between the adjacent light-emitting elements is reduced. In one embodiment, since the height of the light-emitting element 30 is raised by the first auxiliary structure 50, the problem will not exist that the second auxiliary structure 90 blocks an effective light-emitting region of the light-emitting element 30. That is, the second auxiliary structure 90 does not block the effective light-emitting region of the light-emitting element 30 and can block the reflection of the metal wire and the part of light of the light-emitting element 30 (the light which enters the gap 60).

In one embodiment, for example, the second auxiliary structure 90 may be a filling adhesive sheet whose material is typically silicon or acrylic. When the second auxiliary structure is disposed, generally after the transfer of the light-emitting element 30 is completed, the second auxiliary structure 90 is disposed around the light-emitting element 30. For example, a whole layer of black adhesive film is disposed on the plurality of light-emitting elements 30, then the black adhesive film is melt and flows around the light-emitting elements 30, and the melted black adhesive film is solidified so that the second auxiliary structure 90 is formed.

It is to be noted that this embodiment does not specifically limit the method of manufacturing the second auxiliary structure 90. Manufacture of the second auxiliary structure 90 may be according to the actual situation as long as the second auxiliary structure 90 is disposed around the light-emitting element 30.

In one embodiment, with continued reference to FIGS. 17 and 18, the vertical projection of the baffle wall structure 40 on the plane on which the first substrate 10 is located and a vertical projection of the second auxiliary structure 90 on the plane on which the first substrate 10 is located overlap each other.

Exemplarily, the vertical projection of the baffle wall structure 40 on the plane on which the first substrate 10 is located is of a grid-shape structure, and the vertical projection of the second auxiliary structure 90 on the plane on which the first substrate 10 is located is also configured to be of the grid-shape structure. In the direction which is perpendicular to the first substrate 10, the two grid-shape structures overlap each other and the overlapping area is not specifically limited in this embodiment. This configuration has the advantage that no gap exists between the baffle wall structure 40 and the second auxiliary structure 90 in the direction which is perpendicular to the first substrate 10, and the reflection of the metal wire is further blocked, avoiding the problem that when a gap exists between the baffle wall structure 40 and the second auxiliary structure 90, light is irradiated onto the metal wire through the gap and then the light is reflected.

Figure 19:
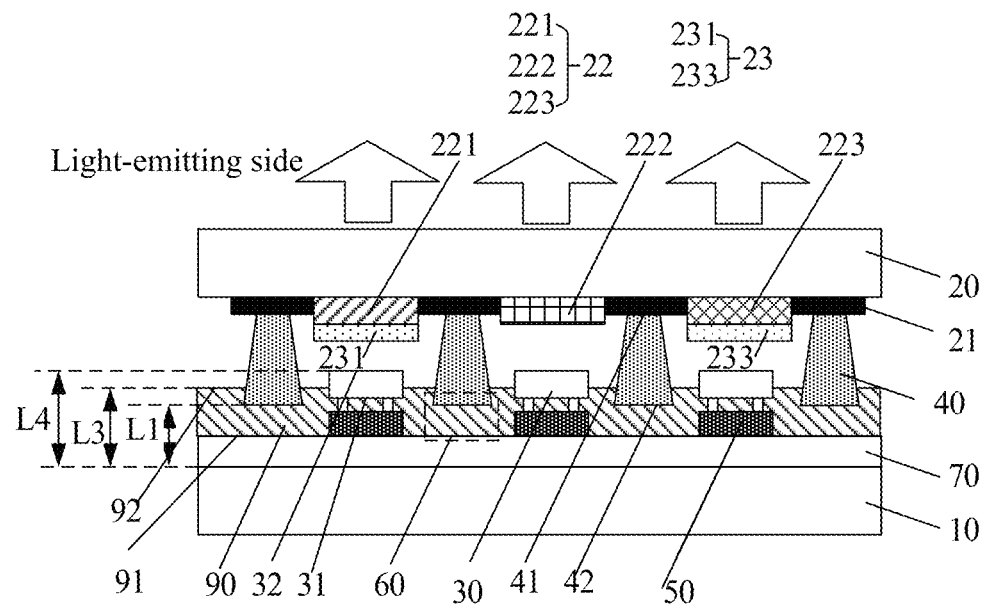
FIG. 19 is a structure diagram of another display panel according to an embodiment of the present disclosure.

In one embodiment, FIG. 19 is a structure diagram of another display panel according to an embodiment of the present disclosure. As shown in FIG. 19, in the direction which is perpendicular to the plane on which the first substrate 10 is located, the baffle wall structure 40 includes the third surface 41 and the fourth surface 42 which are disposed opposite each other. The third surface 41 is located on the side of the fourth surface 42 facing towards the second substrate 20. The distance from the fourth surface 42 to the first substrate 10 is less than or equal to the distance from the sixth surface 92 to the first substrate 10.

When the second auxiliary structure 90 is the filling adhesive sheet, for example, the first substrate 10 and the second substrate 20 may be aligned and bonded to each other before the second auxiliary structure 90 is solidified so that the baffle wall structure 40 on the second substrate 20 can be embedded in the second auxiliary structure 90. Then the second auxiliary structure 90 is solidified.

In this embodiment, the baffle wall structure 40 is embedded in the second auxiliary structure 90, that is, no gap exists between the second auxiliary structure 90 and the baffle wall structure 40 in the direction which is parallel to the first substrate 10. The second auxiliary structure 90 and the baffle wall structure 40 can be used to completely block the light beam emitted by the light-emitting element 30, to completely avoid the optical crosstalk between the adjacent light-emitting elements 30. In addition, the second auxiliary structure 90 can also provide an alignment support force, which can assist to support the baffle wall structure 40 and provide a buffer for alignment and bonding.

Figure 20:
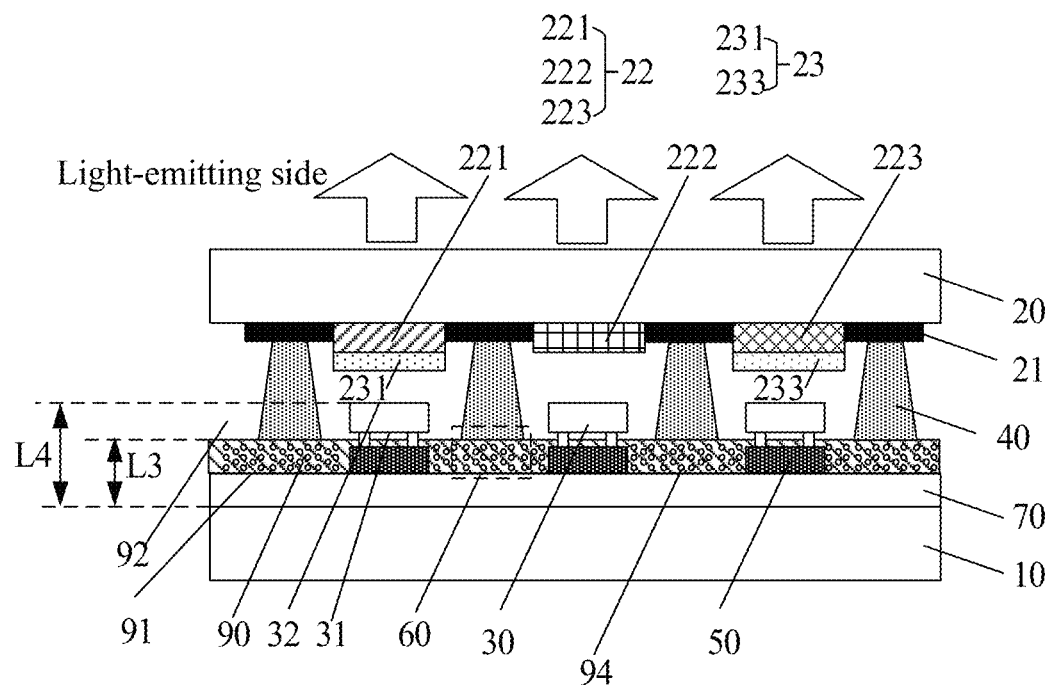
FIG. 20 is a structure diagram of another display panel according to an embodiment of the present disclosure.

In one embodiment, FIG. 20 is a structure diagram of another display panel according to an embodiment of the present disclosure. As shown in FIG. 20, a reflective particle 94 is disposed in the second auxiliary structure 90.

It is to be understood that the reflective particle 94 is a particle that can reflect light. The material of the reflective particle 94 is not specifically limited in this embodiment. For example, the material of the reflective particle 94 may be metal or the like.

In this embodiment, the reflective particle 94 is disposed in the second auxiliary structure 90, on the one hand, lateral light of the light-emitting element 30 can be reflected through the reflective particle 94 into the sub-pixel where the light-emitting element 30 is located, thus preventing the optical crosstalk between the adjacent light-emitting elements 30 and improving the light utilization rate; on the other hand, it is possible to prevent the light from being irradiated onto the metal wire through the second auxiliary structure 90 and furthermore being reflected. Even if a part of light is irradiated onto the metal wire, the part of light can also be reflected toward the direction of the first substrate 10 through the reflective particle 94.

Figure 21:
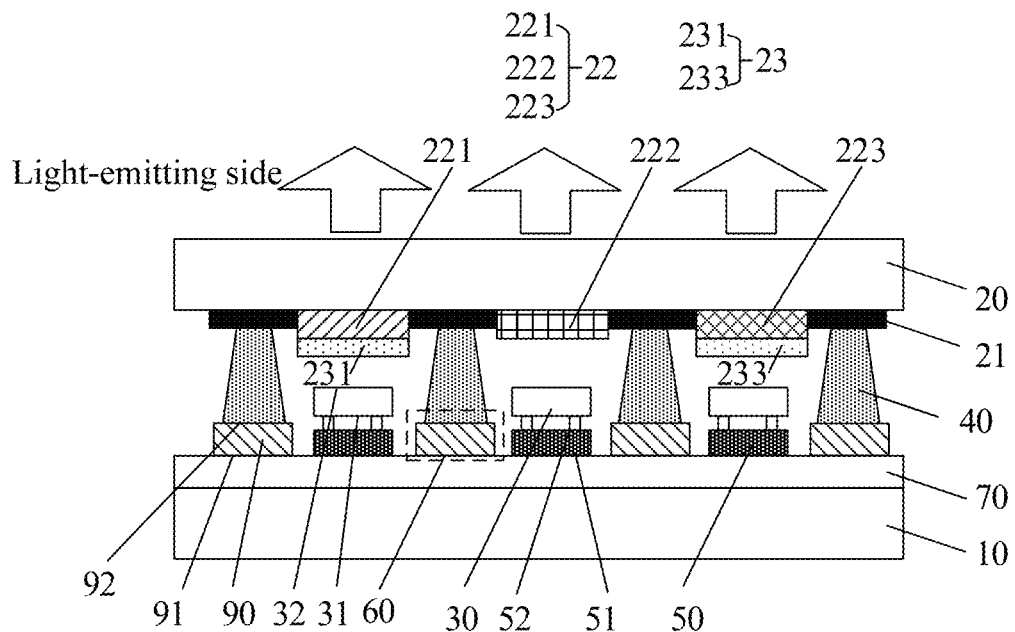
FIG. 21 is a structure diagram of another display panel according to an embodiment of the present disclosure.

In one embodiment, FIG. 21 is a structure diagram of another display panel according to an embodiment of the present disclosure. As shown in FIG. 21, in the direction which is perpendicular to the plane on which the first substrate 10 is located, the first auxiliary structure 50 includes the first surface 51 and the second surface 52 which are disposed opposite each other. The first surface 51 is located on the side of the second surface 52 facing towards the first substrate 10. The second auxiliary structure 90 is disposed on the baffle wall structure 40, and a distance from the fifth surface 91 to the second substrate 20 is equal to a distance from the first surface 51 to the second substrate 20. That is, in the direction which is perpendicular to the first substrate 10, the second auxiliary structure 90 is located between the baffle wall structure 40 and the surface on the side of the pixel circuit layer 70 of the first substrate 10 facing towards the second substrate 20, no gap exists between the second auxiliary structure 90 and the baffle wall structure 40, and no gap exists between the second auxiliary structure 90 and the pixel circuit layer 70, to completely block the light emitted by the light-emitting element 30 and completely avoiding the optical crosstalk between the adjacent light-emitting elements 30.

For example, after the baffle wall structure 40 is formed on the second substrate 20, the adhesive material which is not solidified may be dipped on the surface on the side of the baffle wall structure 40 away from the second substrate 20, and then the first substrate 10 and the second substrate 20 are aligned and bonded to each other so that the second auxiliary structure 90 is located at the position of the gap 60 and the two opposite surfaces of the second auxiliary structure 90 are in contact with the baffle wall structure 40 and the pixel circuit layer 70, respectively, to fill the gap 60 caused by the process fluctuation and the error in alignment and bonding of the baffle wall structure 40.

Figure 22:
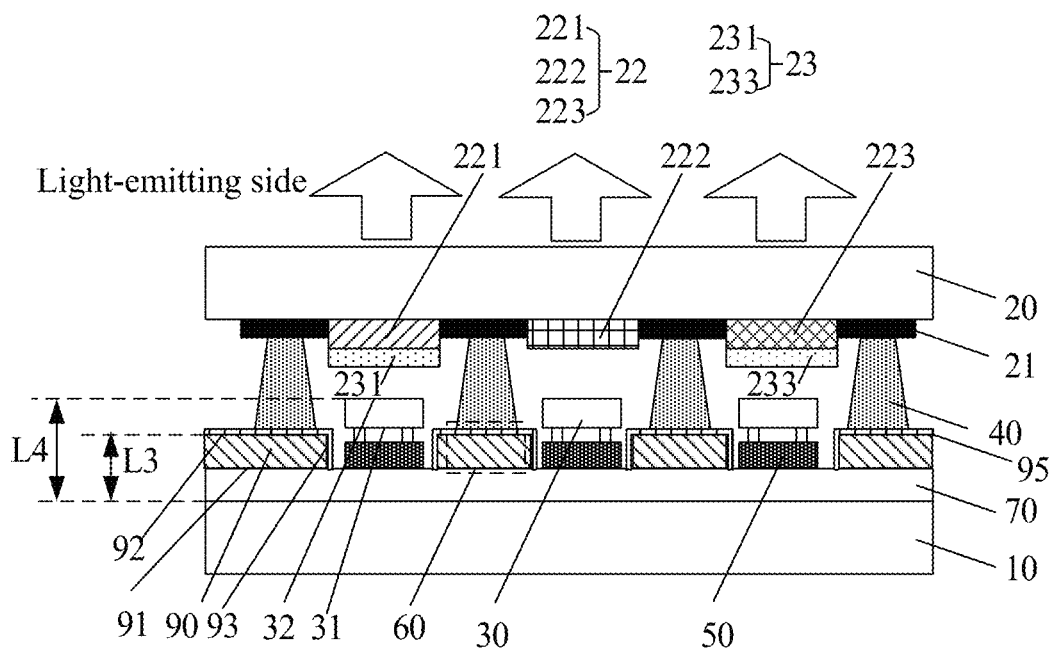
FIG. 22 is a structure diagram of another display panel according to an embodiment of the present disclosure.

In one embodiment, FIG. 22 is a structure diagram of another display panel according to an embodiment of the present disclosure. As shown in FIG. 22, a reflective layer 95 is disposed on the sixth surface 92 of the second auxiliary structure 90 and a sidewall 93 which connects the sixth surface 92 to the fifth surface 91. This configuration has the advantage that the second auxiliary structure 90 is prevented from absorbing the light emitted by the light-emitting element 30 and the light towards the second auxiliary structure 90 is reflected so that the light utilization rate of the light-emitting element 30 is improved.

Figure 23:
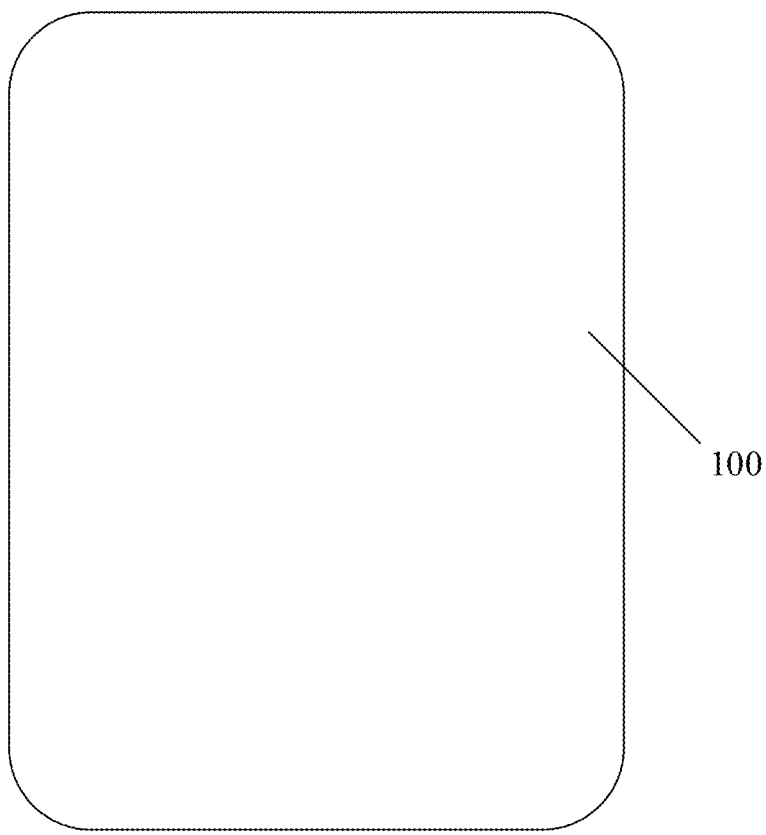
FIG. 23 is a structure diagram of a display device according to an embodiment of the present disclosure.

Based on the same inventive concept, the embodiment of the present disclosure further provides a display device which includes any one of the display panels provided by the above-mentioned embodiments. Exemplarily, as shown in FIG. 23, the display device 110 includes the display panel 100. Therefore, the display device also has the beneficial effects of the display panels in the above-mentioned embodiments, and the same parts may be understood with reference to the preceding descriptions of the display panels and will not be described again hereinafter.

The display device 110 provided by the embodiment of the present disclosure may be a mobile phone as shown in FIG. 23. The display device 110 may also be any electronic product with a display function, including but not limited to the following types: a television, a laptop, a desktop display, a tablet computer, a digital camera, a smart bracelet, smart glasses, a vehicle-mounted display, industrial control equipment, a medical display screen, a touch interactive terminal, and the like, which is not specifically limited in the embodiment of the present disclosure.

What is claimed is:

1. A display panel, comprising:
a first substrate and a second substrate which are disposed opposite each other; and further comprising:
a plurality of light-emitting elements disposed on the first substrate and a plurality of baffle wall structures disposed on the second substrate, wherein the plurality of light-emitting elements and the plurality of baffle wall structures are located between the first substrate and the second substrate, and each baffle wall structure of the plurality of baffle wall structures is located between adjacent ones of the plurality of light-emitting elements; and
a plurality of first auxiliary structures, wherein the plurality of first auxiliary structures are disposed between the first substrate and at least a part of the plurality of light-emitting elements,
wherein the plurality of first auxiliary structures and gaps overlap in a direction parallel to the first substrate, and each of the gaps is a space between a respective one of the plurality of baffle wall structures and the first substrate;
wherein in a direction perpendicular to a plane on which the first substrate is located, each first auxiliary structure comprises a first surface and a second surface which are disposed opposite each other, and the first surface is a surface of each first auxiliary structure facing towards the first substrate; each first auxiliary structure further comprises a sidewall which connects the first surface to the second surface;
each of at least one first auxiliary structure is provide with a notch structure which comprises a first end, a second end and a concave surface which connects the first end to the second end;
wherein the concave surface is recessed inward away from a corresponding baffle wall structure along a direction of the corresponding baffle wall structure pointing to a respective one of the plurality of light-emitting elements;
the first end is located on the sidewall, the second end is located on the first surface, and the second end is located on a side of the first end away from the corresponding baffle wall structure; or
the first end is located on the first surface, the second end is located on the second surface, the sidewall is the concave surface, and the second end is located on a side of the first end away from the corresponding baffle wall structure.

2. The display panel according to claim 1, wherein each baffle wall structure comprises a third surface and a fourth surface which are disposed opposite each other, and the third surface is a surface of each baffle wall structure facing towards the second substrate; and
a distance from the fourth surface to the plane on which the first substrate is located is less than a distance from the second surface to the plane on which the first substrate is located.

3. The display panel according to claim 1, wherein
the first substrate comprises a plurality of sub-pixel regions; the plurality of light-emitting elements are in one-to-one correspondence with the plurality of sub-pixel regions; each of at least a part of the plurality of sub-pixel regions comprises a color conversion layer;
a color of light emitted by the plurality of light-emitting elements is a first color;
the plurality of sub-pixel regions comprise a first sub-pixel region and a second sub-pixel region; the first sub-pixel region comprises the color conversion layer; and the plurality of first auxiliary structures are disposed between the first substrate and light-emitting elements corresponding to the second sub-pixel region.

4. The display panel according to claim 3, further comprising a plurality of touch electrodes and a transparent auxiliary electrode; wherein
the plurality of touch electrodes are located between the plurality of baffle wall structures and the second substrate, and a vertical projection of each touch electrode on the plane on which the first substrate is located at least partially overlaps a vertical projection of a corresponding baffle wall structure on the plane on which the first substrate is located; and
the transparent auxiliary electrode is located in the first sub-pixel region and electrically connected to a touch electrode which is adjacent to the transparent auxiliary electrode.

5. The display panel according to claim 1, wherein
the first substrate comprises a plurality of sub-pixel regions and the plurality of light-emitting elements are in one-to-one correspondence with the plurality of sub-pixel regions;
the plurality of sub-pixel regions comprise a first sub-pixel region and a second sub-pixel region;
one part of the plurality of first auxiliary structures is disposed between the first substrate and light-emitting elements corresponding to the first sub-pixel region; and
another part of the plurality of first auxiliary structures is disposed between the first substrate and light-emitting elements corresponding to the second sub-pixel region.

6. The display panel according to claim 1, wherein
the first substrate comprises a plurality of sub-pixel regions; the plurality of light-emitting elements are in one-to-one correspondence with the plurality of sub-pixel regions;
the plurality of sub-pixel regions comprise a first sub-pixel region and a second sub-pixel region;
luminescence efficiency of the first sub-pixel region is higher than luminescence efficiency of the second sub-pixel region; and
first auxiliary structures corresponding to the first sub-pixel region comprise a black material; and first auxiliary structures corresponding to the second sub-pixel region comprise a white material or a transparent material.

7. The display panel according to claim 1, wherein
the first substrate comprises a plurality of sub-pixel regions; the plurality of light-emitting elements are in one-to-one correspondence with the plurality of sub-pixel regions;
the plurality of sub-pixel regions comprise a first sub-pixel region and a second sub-pixel region;
luminescence efficiency of the first sub-pixel region is higher than luminescence efficiency of the second sub-pixel region; and
a reflective structure is disposed on a side, facing away from the first substrate, of at least one of first auxiliary structures corresponding to the second sub-pixel region.

8. The display panel according to claim 1, further comprising a second auxiliary structure, wherein the second auxiliary structure is disposed around each light-emitting element of the plurality of light-emitting elements;

the second auxiliary structure comprises a fifth surface and a sixth surface which are disposed opposite each other in the direction perpendicular to the plane on which the first substrate is located; the fifth surface is a surface of the second auxiliary structure facing towards the first substrate; each light-emitting element comprises a seventh surface and an eighth surface which are disposed opposite each other, and the seventh surface is a surface of each light-emitting element facing towards the first substrate; and a distance from the sixth surface to the plane on which the first substrate is located is less than a distance from the eighth surface to the plane on which the first substrate is located.

9. The display panel according to claim 8, wherein a vertical projection of each baffle wall structure on the plane on which the first substrate is located and a vertical projection of the second auxiliary structure on the plane on which the first substrate is located overlap.

10. The display panel according to claim 9, wherein in the direction perpendicular to the plane on which the first substrate is located, each baffle wall structure comprises a third surface and a fourth surface which are disposed opposite each other, and the third surface is a surface of each baffle wall structure facing towards the second substrate; and a distance from the fourth surface to the first substrate is equal to a distance from the sixth surface to the first substrate.

11. The display panel according to claim 8, wherein a reflective particle is disposed in the second auxiliary structure.

12. The display panel according to claim 9, wherein
the second auxiliary structure is disposed on each baffle wall structure, and
a distance from the fifth surface to the second substrate is equal to a distance from the first surface to the second substrate.

13. The display panel according to claim 8, wherein a reflective layer is disposed on the sixth surface and a sidewall which connects the sixth surface to the fifth surface of the second auxiliary structure.

14. The display panel according to claim 1, wherein in the direction parallel to the first substrate, a distance between each baffle wall structure and each first auxiliary structure is W, and W satisfies the condition $2 \, \mu m \leq W \leq 8 \, \mu m$.

15. The display panel according to claim 1, wherein along the direction perpendicular to the plane on which the first substrate is located, a sectional shape of each baffle wall structure comprises a regular trapezoid.

16. A display device, comprising:
a display panel, comprising:
a first substrate and a second substrate which are disposed opposite each other; and further comprising:
a plurality of light-emitting elements disposed on the first substrate and a plurality of baffle wall structures disposed on the second substrate, wherein the plurality of light-emitting elements and the plurality of baffle wall structures are located between the first substrate and the second substrate, and each baffle wall structure of the plurality of baffle wall structures is located between adjacent ones of the plurality of light-emitting elements; and
a plurality of first auxiliary structures, wherein the plurality of first auxiliary structures are disposed between the first substrate and at least a part of the plurality of light-emitting elements,
wherein the plurality of first auxiliary structures and gaps overlap in a direction parallel to the first substrate, and each of the gaps is a space between a respective one of the plurality of baffle wall structures and the first substrate;
wherein in a direction perpendicular to a plane on which the first substrate is located, each first auxiliary structure comprises a first surface and a second surface which are disposed opposite each other, and the first surface is a surface of each first auxiliary structure facing towards the first substrate; each first auxiliary structure further comprises a sidewall which connects the first surface to the second surface;
each of at least one first auxiliary structure is provide with a notch structure which comprises a first end, a second end and a concave surface which connects the first end to the second end;
wherein the concave surface is recessed inward away from a corresponding baffle wall structure along a direction of the corresponding baffle wall structure pointing to a respective one of the plurality of light-emitting elements;
the first end is located on the sidewall, the second end is located on the first surface, and the second end is located on a side of the first end away from the corresponding baffle wall structure; or
the first end is located on the first surface, the second end is located on the second surface, the sidewall is the concave surface, and the second end is located on a side of the first end away from the corresponding baffle wall structure.

* * * * *